(12) United States Patent
Ishida et al.

(10) Patent No.: US 7,580,605 B2
(45) Date of Patent: Aug. 25, 2009

(54) THREE-DIMENSIONAL OPTICAL WAVEGUIDE, METHOD OF MANUFACTURING SAME, OPTICAL MODULE, AND OPTICAL TRANSMISSION SYSTEM

(75) Inventors: Kaoru Ishida, Shijyonawate (JP); Tsuguhiro Korenaga, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/600,730

(22) Filed: Nov. 17, 2006

(65) Prior Publication Data

US 2007/0062221 A1 Mar. 22, 2007

Related U.S. Application Data

(62) Division of application No. 10/370,605, filed on Feb. 24, 2003, now abandoned.

(30) Foreign Application Priority Data

Feb. 28, 2002 (JP) .............................. 2002-054375

(51) Int. Cl.
G02B 6/10 (2006.01)

(52) U.S. Cl. ...................... 385/129; 385/14; 385/47; 385/31; 385/901; 385/49; 385/130; 385/132; 385/131

(58) Field of Classification Search ................... 385/14, 385/47, 31, 901, 129, 130, 131, 132, 49
See application file for complete search history.

(56) References Cited

U.S. PATENT DOCUMENTS

| | | | |
|---|---|---|---|
| 5,198,008 A * | 3/1993 | Thomas | 385/130 |
| 6,314,228 B1 * | 11/2001 | Korenaga et al. | 385/129 |
| 6,483,786 B1 | 11/2002 | Izawa | |
| 6,519,393 B2 * | 2/2003 | Booth et al. | 385/50 |
| 6,656,560 B2 * | 12/2003 | Yamamoto et al. | 428/64.4 |
| 6,810,160 B2 * | 10/2004 | Sugama et al. | 385/14 |
| 2001/0053260 A1 | 12/2001 | Takizawa et al. | |
| 2002/0109074 A1 * | 8/2002 | Uchida | 250/214.1 |
| 2002/0118907 A1 * | 8/2002 | Sugama et al. | 385/14 |
| 2003/0010936 A1 * | 1/2003 | Udagawa et al. | 250/492.21 |
| 2005/0041906 A1 | 2/2005 | Sugama et al. | |
| 2005/0259935 A1 * | 11/2005 | Hamada | 385/129 |
| 2006/0008224 A1 * | 1/2006 | Shimizu et al. | 385/129 |

(Continued)

FOREIGN PATENT DOCUMENTS

DE 10054370 5/2002

(Continued)

OTHER PUBLICATIONS

Balliet et al., Optical Transmission System for Interconnecting Electronic Units; Sep. 1984; IBM Technical Disclosure Bulletin, 1793-96.*

(Continued)

*Primary Examiner*—James P Hughes
(74) *Attorney, Agent, or Firm*—Smith, Gambrell & Russell, LLP

(57) ABSTRACT

A three-dimensional-optical waveguide is formed by laminating planar substrates such as a plurality of lens substrates and, an isolator substrate and a wavelength division multiplexing filter, the optical substrates at least include a waveguide substrate having a waveguide and a reflecting surface. In the three-dimensional optical waveguide, the planar substrates are positioned by markers integrally formed on at least two of the planar substrates. Light directed into the waveguide is reflected by a reflecting surface and passes through the lens substrates and the isolator substrate.

8 Claims, 26 Drawing Sheets

U.S. PATENT DOCUMENTS

| | | | |
|---|---|---|---|
| 2006/0073273 A1* | 4/2006 | Yokoyama | 427/162 |
| 2006/0098933 A1* | 5/2006 | Shelnut et al. | 385/145 |
| 2007/0058904 A1* | 3/2007 | Ban et al. | 385/52 |

FOREIGN PATENT DOCUMENTS

| | | | |
|---|---|---|---|
| EP | 1 026 675 | | 8/2000 |
| EP | 2000235127 | * | 8/2000 |
| GB | 2 302 681 A | | 1/1997 |
| JP | 2001-110188 | * | 4/2001 |
| JP | 2002-258081 | | 9/2002 |
| JP | 2003-207662 | | 7/2003 |
| WO | WO 02/10814 | | 2/2002 |

OTHER PUBLICATIONS

Office Action—European Appln. No. 03004550.4 from the EPO (Feb. 15, 2006).

* cited by examiner

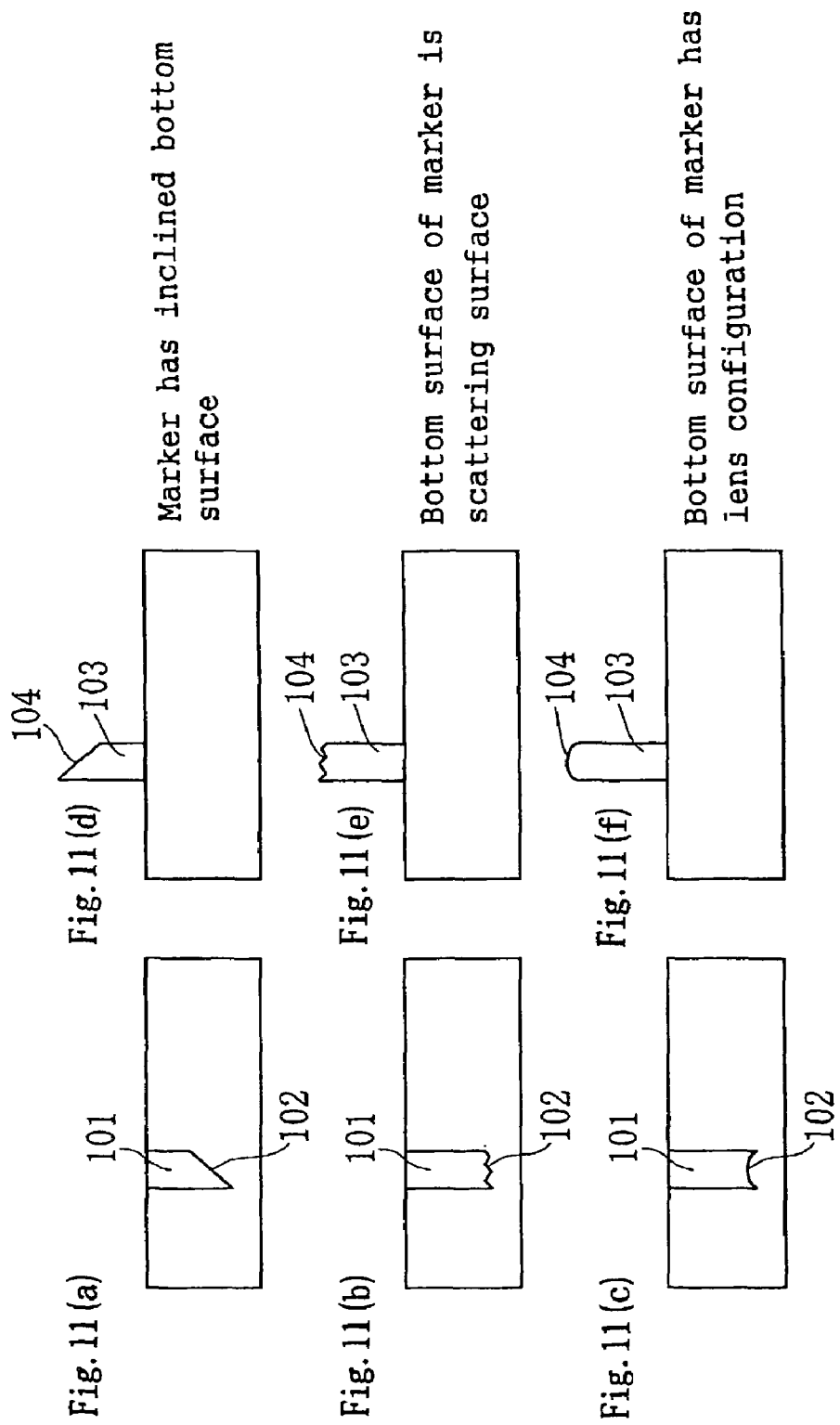

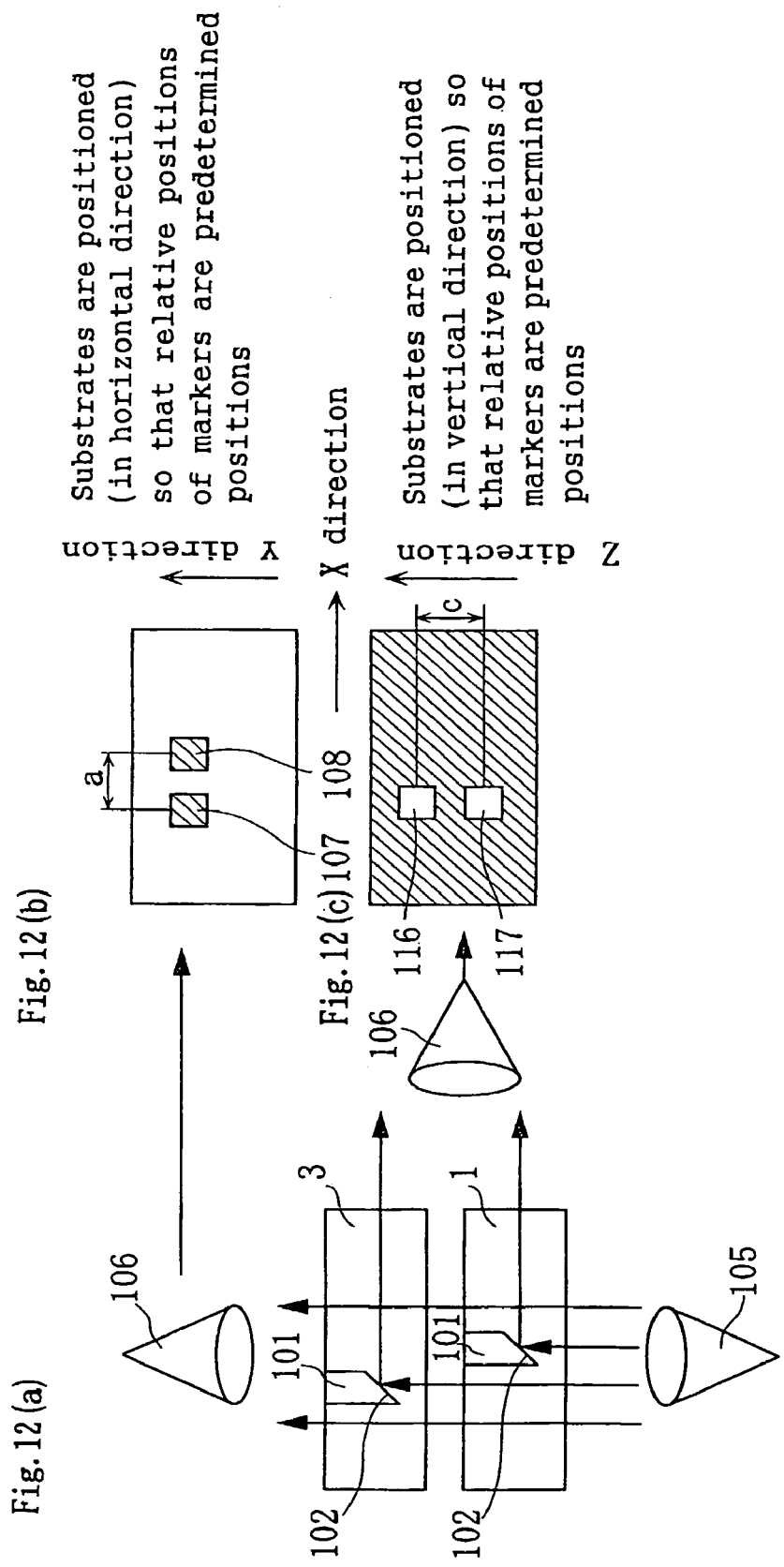

Fig. 14 (a)
Fig. 14 (b)
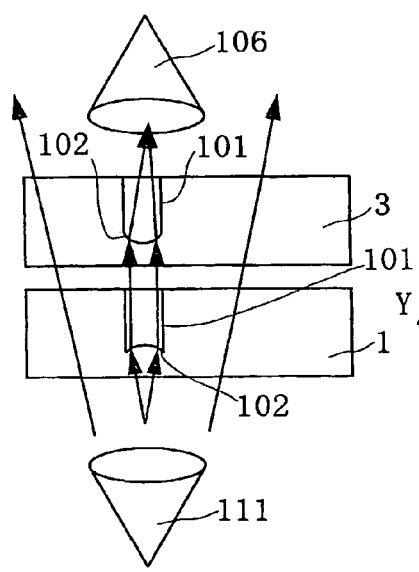
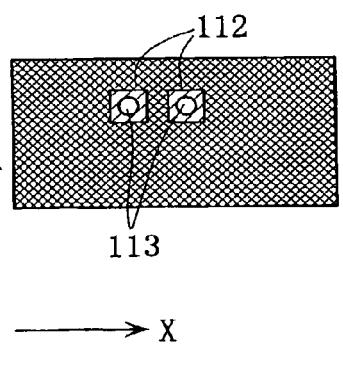
Substrates are positioned so that relative positions of markers are predetermined positions Fig. 15 (a)    Fig. 15 (b)
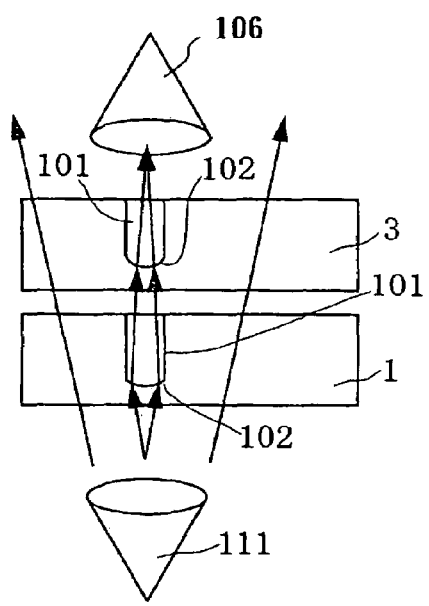
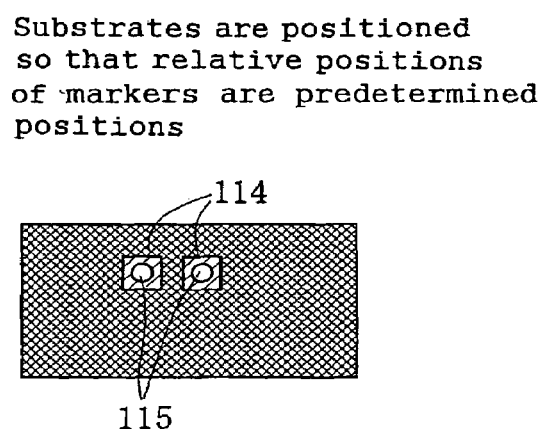
Substrates are positioned so that relative positions of markers are predetermined positions

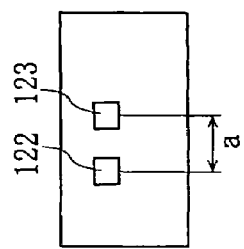
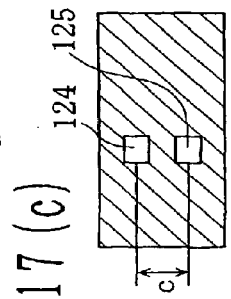
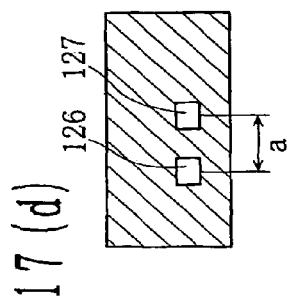
Fig. 17(b)
Fig. 17(c)
Fig. 17(d)
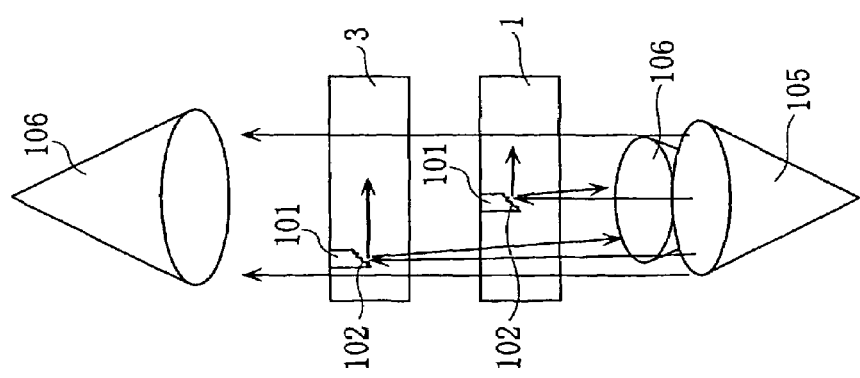
Fig. 17(a)

Fig. 18 (a)  Fig. 18 (b)
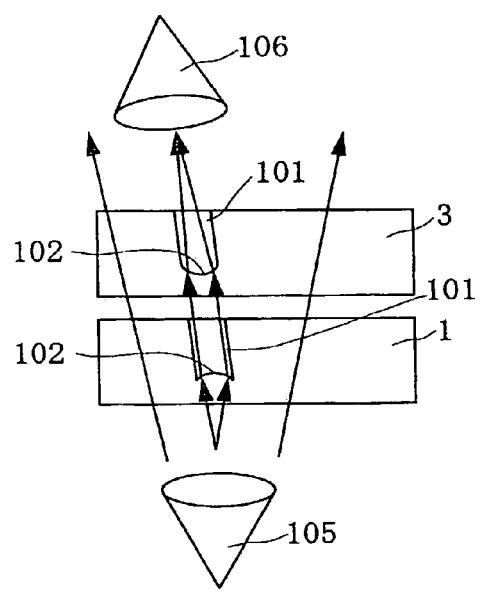
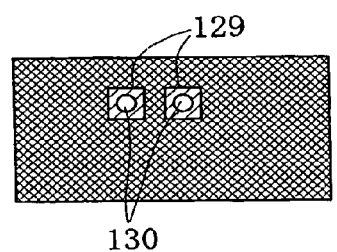
Substrates are positioned
so that relative positions
of markers are predetermined
positions

THREE-DIMENSIONAL OPTICAL WAVEGUIDE, METHOD OF MANUFACTURING SAME, OPTICAL MODULE, AND OPTICAL TRANSMISSION SYSTEM

CROSS REFERENCE TO RELATED APPLICATION

This application is a division of Ser. No. 10/370,605, filed Feb. 24, 2003 now abandoned and which is being incorporated in its entirety herein by reference.

BACKGROUND OF THE INVENTION

1. Field of the Invention

The present invention relates to a three-dimensional optical waveguide, a method of manufacturing the same, an optical module, and an optical transmission system for enhancing the performance of an optical device.

2. Related Art of the Invention

Conventionally, when a three-dimensional optical waveguide is formed, for example, in order that light traveling through a waveguide is output vertically with respect to the waveguide, as shown in FIG. 26, a planar filter 1006 such as a wavelength division multiplexing (WDM) filter is inserted in a groove 1002 obliquely formed in a planar waveguide 1001, and the light reflected or transmitted by the planar filter 1006 is oriented with respect to a light receiving element 1008, a lens system and another planar optical waveguide which are disposed spatially, thereby forming the three-dimensional optical waveguide.

However, in such a three-dimensional optical waveguide, spatial adjustment in each waveguide and the lens system is extremely difficult. For example, when a planar wavelength division multiplexing filter is inserted in a planar optical waveguide, it is necessary that the formation of the groove for supporting the wavelength division multiplexing filter be performed extremely precisely. In addition, after the insertion of the wavelength division multiplexing filter into the groove, a precise adjustment for fine positioning of the wavelength division multiplexing filter is further required.

Therefore, when it is intended to enhance the performance by inserting an optical device such as an isolator in such a three-dimensional optical waveguide, since the number of parts requiring adjustment increases, the cost increases.

SUMMARY OF THE INVENTION

In view of the above-mentioned problem, an object of the present invention is to provide a three-dimensional optical waveguide, a method of manufacturing the same, an optical module and an optical transmission system that are low in cost and do not require complicated adjustment.

The 1st aspect of the present invention is a three-dimensional optical waveguide comprising a lamination of at least a planar substrate (1, 31, 51, 61, 71, 91, 301, 711, 1311, 1321, 1331) having a planar optical waveguide (2, 12, 22, 32, 52, 62, 72, 92, 702, 712, 902, 1322, 1332, 1342, 1352, 1362) and a planar substrate (3, 8, 10, 30, 33, 43, 53, 63, 70, 73, 76, 93, 98, 300, 900, 1308, 1330, 1340, 1343, 1350) having a sheet optical element (4, 5, 6, 7, 9, 24, 34, 29, 44, 54, 64, 74, 79, 94, 95, 96, 97, 209, 304, 404, 704, 904, 906, 909, 914, 919, 1304, 1305, 1306, 1307, 1316, 1324, 1334, 1344, 1354, 1364).

The 2nd aspect of the present invention is a three-dimensional optical waveguide according to the 1st aspect, wherein the planar substrate having a sheet optical element is one of a lens layer, an isolator layer and a filter layer.

The 3rd aspect of the present invention is a three-dimensional optical waveguide according to the 2nd aspect, wherein the planar substrate having the planar waveguide, and the said one of the lens layer, the isolator layer and the filter layer are integrally formed on forming glass.

The 4th aspect of the present invention is a three-dimensional optical waveguide according to the 2nd aspect or 3rd aspect, wherein a reflecting surface is formed on the planar optical waveguide and light passes through the said one of the lens layer, the isolator layer and the filter layer.

The 5th aspect of the present invention is a three-dimensional optical waveguide according to the 4th aspect, further comprising at least one of a light receiving element and a light emitting element.

The 6th aspect of the present invention is a three-dimensional optical waveguide according to the 1st aspect, wherein the planar substrates are positioned with respect to each other by markers integrally formed on at least two planar substrates.

The 7th aspect of the present invention is a method of manufacturing a three-dimensional optical waveguide comprising:

providing a plurality of planar substrates (3, 8, 10, 30, 33, 43, 53, 63, 70, 73, 76, 93, 98, 300, 900, 1308, 1330, 1340, 1343, 1350), each having a planar optical waveguide;

forming a marker (101, 103) on each of the planar substrates (3, 8, 10, 30, 33, 43, 53, 63, 70, 73, 76, 93, 98, 300, 900, 1308, 1330, 1340, 1343, 1350) at a same time; and laminating the planar substrates (3, 8, 10, 30, 33, 43, 53, 63, 70, 73, 76, 93, 98, 300, 900, 1308, 1330, 1340, 1343, 1350) by positioning the planar substrates by using the markers (101, 103).

The 8th aspect of the present invention is a method of manufacturing a three-dimensional optical waveguide according to the 7th aspect, wherein the markers have one of a concave or convex shape, and wherein before the planar substrates are laminated, the planar substrates are positioned by applying light to the markers and causing the light to be reflected or transmitted by the markers.

The 9th aspect of the present invention is a method of manufacturing a three-dimensional optical waveguide according to the 8th aspect, wherein bottom surfaces of the markers are one of inclined surfaces, scattering surfaces and lens surfaces.

The 10th aspect of the present invention is an optical transmitter module, comprising:

an electric input terminal (1105);

a light emitting element (69, 89, 999, 1209, 1219, 1229, 1239, 1249) connected to the electric input terminal (1105);

the three-dimensional optical waveguide according to the 3rd aspect, the waveguide transmitting light emitted from the light emitting element (69, 89, 999, 1209, 1219, 1229, 1239, 1249); and an optical output terminal (1107) outputting light transmitted through the three-dimensional optical waveguide.

The 11th aspect of the present invention is an optical receiver module, comprising:

an optical input terminal (1117);

the three-dimensional optical waveguide according to the 3rd aspect connected to the optical input terminal (1117);

a light receiving element, that receives light (59, 99, 1109, 1119, 1129, 1139, 1149) transmitted through the three-dimensional optical waveguide; and an electric output terminal (1115) connected to the light receiving element.

The 12th aspect of the present invention is an optical transmitter and receiver module, comprising:

an electric input terminal (1105);

a three-dimensional optical waveguide including a lamination of at least a planar substrate (3, 8, 10, 30, 33, 43, 53, 63, 70, 73, 76, 93, 98, 300, 900, 1308, 1330, 1340, 1343, 1350) having a planar optical waveguide (2, 12, 22, 32, 52, 62, 72, 92, 702, 712, 902, 1322, 1332, 1342, 1352, 1362), a planar substrate (3, 8, 10, 30, 33, 43, 53, 63, 70, 73, 76, 93, 98, 300, 900, 1308, 1330, 1340, 1343, 1350) having an isolator (8, 98, 1108, 1118, 1128, 1308), and a planar substrate (3, 8, 10, 30, 33, 43, 53, 63, 70, 73, 76, 93, 98, 300, 900, 1308, 1330, 1340, 1343, 1350) having a wavelength division multiplexing filter;

a light emitting element (69, 89, 999, 1209, 1219, 1229, 1239, 1249) connected to the electric input terminal (1105) and connected to the three-dimensional optical waveguide;

a light receiving element (69,89,999,1209,1219,1229,1239,1249) connected to the three-dimensional optical waveguide;

an electric output terminal (1115) connected to the light receiving element (69,89,999,1209,1219,1229,1239,1249); and an optical input and output terminal (1115) connected to the three-dimensional optical waveguide, wherein an electric signal input from the electric input terminal (1105) is converted into an optical signal and transmitted from the optical input and output terminal (1115), and an optical signal received by the optical input and output terminal (1115) is converted into an electric signal and output to the electric output terminal.

The 13th aspect of the present invention is an optical transmission system for transmission and reception, comprising:

an optical transmitter module, including:
  an electric input terminal;
  a light emitting element connected to the electric input terminal;
  a three-dimensional optical waveguide having:
    a lamination of at least a planar substrate having a planar optical waveguide connected to the light emitting element and a planar substrate having a sheet optical element;
    the waveguide is transmitting light emitted from the light emitting element; and
  an optical output terminal outputting light transmitted through the three-dimensional optical waveguide;
an optical fiber cable connected to the optical transmitter module; and
an optical receiver module, including:
  an optical input terminal;
  a three-dimensional optical waveguide having:
    a lamination of at least a planar substrate having a planar optical waveguide connected to the optical input terminal and a planar substrate having a sheet optical element;
  a light receiving element, that receives light transmitted through the three-dimensional optical waveguide; and
  an electric output terminal connected to the light receiving element;
the optical receiver module is connected to the optical fiber cable.

The 14th aspect of the present invention is an optical transmission system for optical transmission and reception, comprising:

the optical transmitter and receiver module according to 12th aspect; and an optical fiber cable connected to the optical transmitter and receiver module.

BRIEF DESCRIPTION OF THE DRAWINGS

FIGS. 11(*a*) to 11(*f*) are cross-sectional views showing a marker formed in each substrate and used when the three-dimensional optical waveguide of the present invention is manufactured.

FIGS. 12(*a*) to 12(*c*) are schematic views showing a method of manufacturing the three-dimensional optical waveguide of the present invention.

FIGS. 14(*a*) and 14(*b*) are schematic views showing a further method of manufacturing the three-dimensional optical waveguide of the present invention.

FIGS. 15(*a*) and 15(*b*) are schematic views showing a still further method of manufacturing the three-dimensional optical waveguide of the present invention.

FIGS. 17(a) to 17(d) are schematic views showing still another method of manufacturing the three-dimensional optical waveguide of the present invention.

FIGS. 18(a) and 18(b) are schematic views showing a still further method of manufacturing the three-dimensional optical waveguide of the present invention.

Figure 1:
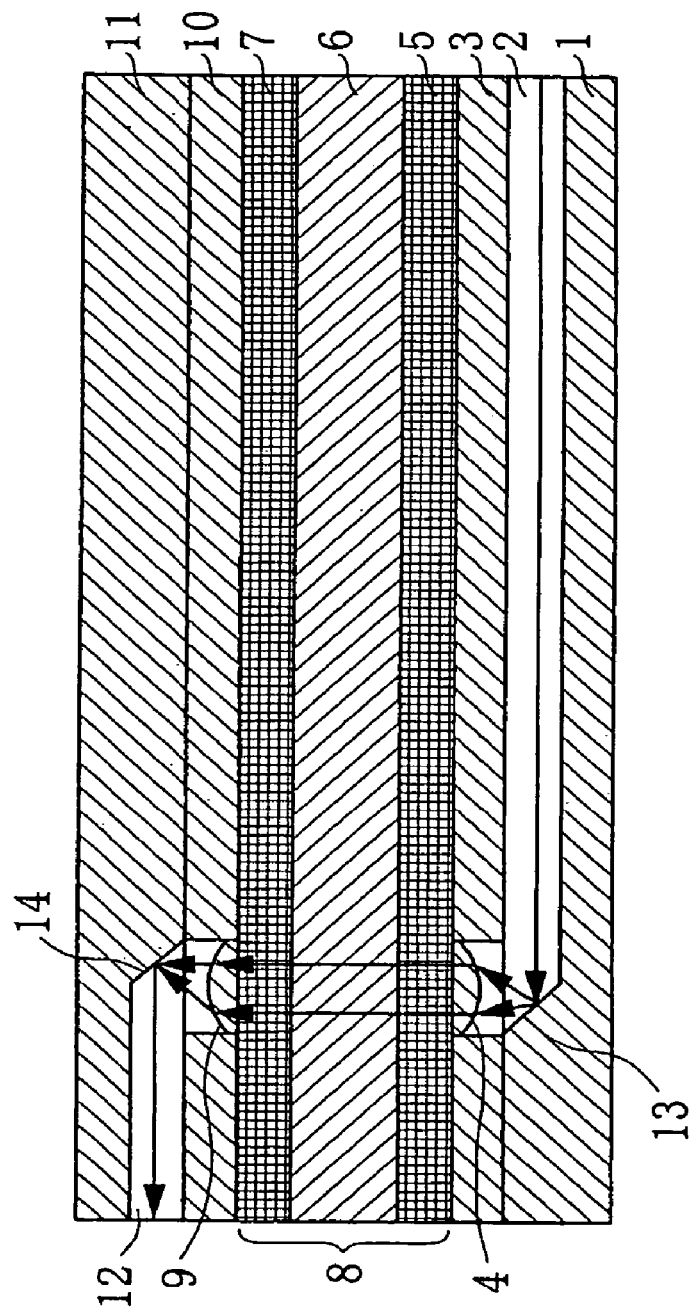
FIG. 1 is a cross-sectional view showing the structure of a three-dimensional optical waveguide according to a first embodiment of the present invention.

EXPLANATION OF REFERENCE NUMERALS 1, 11 Waveguide substrate
2, 12 Waveguide
3, 10 Lens substrate
4, 9 Lens
8 Isolator substrate
13, 14 Reflecting surface
59, 99 Surface emitting laser
69, 89 Surface-mount photodiode
101, 103 Marker
102, 104 Bottom surface
105 Light source
106 Light receiver
107, 108 Image

EMBODIMENTS OF THE INVENTION

First Embodiment

FIG. 1 shows the cross-sectional structure of a three-dimensional optical waveguide according to a first embodiment of the present invention.

A waveguide substrate 1 as the planar substrate having a planar waveguide of the present invention is formed of forming glass, and a waveguide 2 which is the planar optical waveguide of the present invention is formed on the top surface of the waveguide substrate 1. At an end of the waveguide 2, a reflecting surface 13 which is the reflecting surface of the present invention comprising a mirror or the like is formed. On the top surface of the waveguide substrate 1, a lens substrate 3 which is the planar substrate having a lens layer of the present invention is laminated. In the lens substrate 3, a lens 4 is integrally formed of forming glass (the same for the lens substrate described below).

Above the lens substrate 3, a polarizer 5, a Faraday rotator 6 and a polarizer 7 are laminated in this order. These elements constitute an isolator substrate 8 which is the planar substrate having an isolator of the present invention. On the top surface of the isolator substrate 8, a lens substrate 10 is laminated which is the planar substrate having a lens layer of the present invention. In the lens substrate 10, a lens 9 is integrally formed of forming glass. Above the lens layer 10, a waveguide substrate 11 which is the planar optical waveguide of the present invention is laminated. The waveguide substrate 11 is also formed of forming glass.

In a lower part of the waveguide substrate 11, a waveguide 12 which is the planar optical waveguide of the present invention is formed. At an end of the waveguide 12, a reflecting surface 14 which is the reflecting surface of the present invention comprising a mirror or the like is formed. The reflecting surface 13, the lens 4, the lens 9 and the reflecting surface 14 are disposed so that the horizontal positions thereof are aligned in the vertical direction. The method of position alignment will be described later. The reflecting surface 13 is angled (inclined by 45°) so that light traveling along the horizontal direction is made to travel in the vertical direction. The reflecting surface 14 is angled (inclined by 45°) so that light traveling along the vertical direction is made to travel in the horizontal direction). The substrates are bonded by an ultraviolet cure adhesive or the like.

In this description, it is assumed that the vertical direction and the horizontal (longitudinal) direction coincide with the vertical direction and the horizontal (longitudinal) direction of FIG. 1 (this applies to the description that follows).

When such a three-dimensional optical waveguide is manufactured, as described above, precise position alignment is necessary between the waveguide substrate 1 having the reflecting surface 13 and the lens substrate 3 having the lens 4, between the lens substrate 3 and the lens substrate 10 having the lens 9 and between the lens substrate 10 and the optical waveguide substrate 11 having the reflecting surface 14. FIGS. 11 to 12 are views for assistance in explaining the method of such position alignment.

First, a concave marker 101 as shown in FIG. 11(a) is formed integrally with the substrates (the waveguide substrate 1, the lens substrate 3, the lens substrate 10, and the waveguide substrate 11) by pressing the forming glass. As shown in FIG. 11(a), the marker 101 has a bottom surface 102 angled at 45°.

Next, with reference to FIGS. 12(a) to 12(c), the process of aligning the substrates will be described with the waveguide substrate 1 and the lens substrate 3 as an example.

The bottom surfaces 102 angled as described above are formed in the same direction with respect to the direction of length of the substrates. The horizontal positions of the markers 101 formed on the substrates are determined so that predetermined spacings are provided in the direction of length of the substrates (hereinafter, referred to as the X direction), in the direction orthogonal to the X direction within the planes of the substrates (hereinafter, referred to as the Y direction) and in the direction in which the substrates are laminated (the vertical direction, that is, the direction orthogonal to the X and the Y directions, hereinafter, referred to as the Z direction). For example, the substrates are laminated so that, as shown in FIGS. 12(a) to 12(c), the position of the marker 101 formed in the waveguide substrate 1 and the position of the marker 101 formed in the lens substrate 3 are the same in the Y direction of the substrates, a predetermined spacing a is provided in the X direction and a predetermined spacing c is provided in the Z direction.

As shown in FIG. 12(a), the waveguide substrate 1 is disposed below, and the lens substrate 3 is disposed above the waveguide substrate 1 through an ultraviolet cure adhesive. Then, a light source 105 emitting parallel light is disposed below the waveguide substrate 1, and a light receiver 106 such as a CCD camera is disposed above the lens substrate 3 and at a side of the laminated substrates. When parallel light is emitted from the light source 105, part of the emitted parallel light is reflected by the bottom surfaces 102 in parts where the markers 101 are present, and the reflected part of the light reaches the light receiver 106 disposed at a side of the laminated substrates. At the parts where the markers 101 are absent, the emitted parallel light is all transmitted, and the transmitted light reaches the light receiver 106 disposed above the lens substrate 3.

FIG. 12(b) shows images obtained from the light receiver 106 disposed above the lens substrate 3 in this manner. Here, an image 108 corresponds to the marker 101 formed in the waveguide 1, and an image 107 corresponds to the marker 101 formed in the lens substrate 3. These images are shown on the light receiver 106 as parts darker than any peripheral part. Then, adjustment is made by moving the waveguide substrate 1 and the lens substrate 3 in the horizontal direction so that the positions of the images 107 and 108 in the Y direction coincide with each other and the spacing between the images 107 and 108 in the X direction is the predetermined spacing a.

FIG. 12(c) shows images obtained from the light receiver 106 disposed at a side of the laminated substrates as described above. Here, an image 116 corresponds to the marker 101 formed in the lens substrate 3, and an image 117 corresponds to the marker 101 formed in the waveguide substrate 1. These images are shown on the light receiver 106 as parts brighter than any peripheral part. Then, adjustment is made by moving the waveguide 1 and the lens substrate 3 in the Z direction so that the spacing between the image 116 and the image 117 is the predetermined spacing c. When the elements are brought into predetermined position alignment, ultraviolet light is applied to the waveguide substrate 1 and the lens substrate 3 to cure the ultraviolet-cure adhesive filling the space between the waveguide substrate 1 and the lens substrate 3, thereby bonding the substrates 1 and 3.

Likewise, position alignment is made between the lens substrate 3 and the lens substrate 10 and between the lens substrate 10 and the waveguide substrate 11. At this time, the position alignment between the lens substrate 3 and the lens substrate 10 is performed by an operation similar to the above-described one with the isolator substrate 8 sandwiched between the lens substrate 3 and the lens substrate 10.

At this time, while the predetermined spacing a may be different among the substrates, it is determined so that the horizontal positions of the reflecting surface 13, the lens 4, the lens 9 and the reflecting surface 9 are aligned in the vertical direction when the substrates are laminated.

Next, the operation performed when such a three-dimensional optical waveguide is used will be described.

The light directed into the waveguide substrate 1 travels through the waveguide 2, and is reflected upward by the reflecting surface 13 to be incident on the lens 4. The light having exited from the lens 4 passes through the isolator substrate 8 and the lens 9, is horizontally reflected by the reflecting surface 4, and travels through the waveguide 12.

By doing this, a low-cost and precise three-dimensional optical waveguide not requiring a complicated adjustment is provided.

While in the description given above, the substrates are positioned so that the horizontal positions (in the X direction and in the Y direction) of the markers 101 formed in the substrates are the same in the Y direction and the predetermined spacing a is provided in the X direction, the substrates may be positioned so that a predetermined spacing b is provided in the Y direction.

Figure 2:
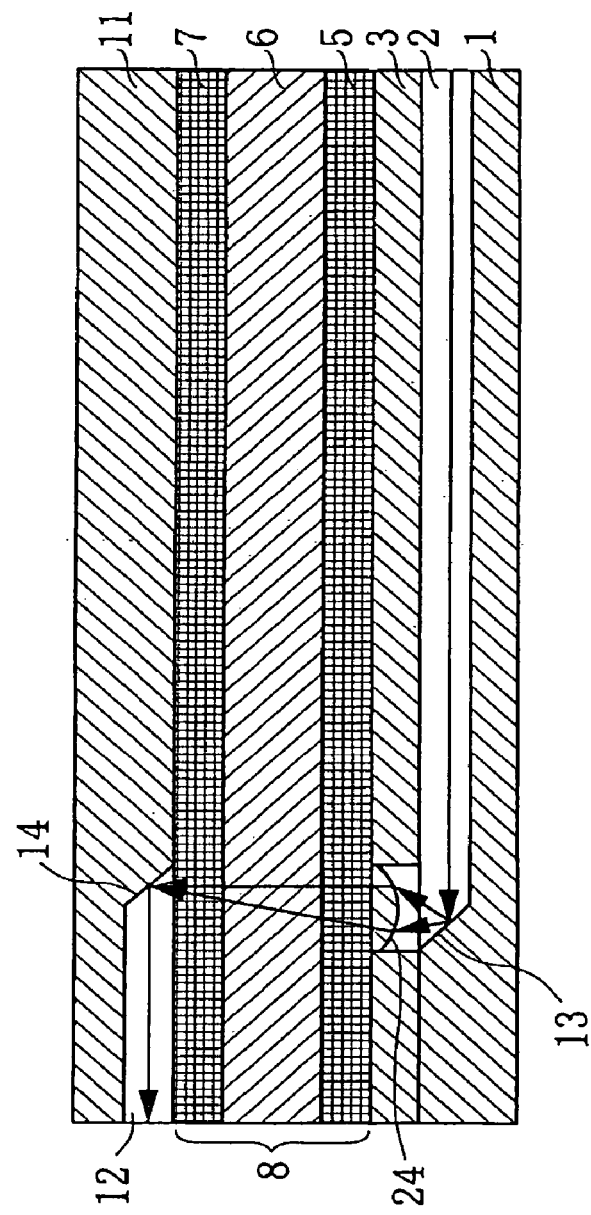
FIG. 2 is a cross-sectional view showing the structure of a three-dimensional optical waveguide according to a modification of the first embodiment of the present invention.

In the first embodiment, the lens substrate 10 is present between the isolator substrate 8 and the waveguide substrate 11. However, when the light reflected by the reflecting surface 13 can be condensed on the reflecting surface 14 only by a lens 24 as shown in FIG. 2, the lens substrate 10 is unnecessary. In that case, similar effects to those described above are obtained.

Figures 13A, 13B, 13C:
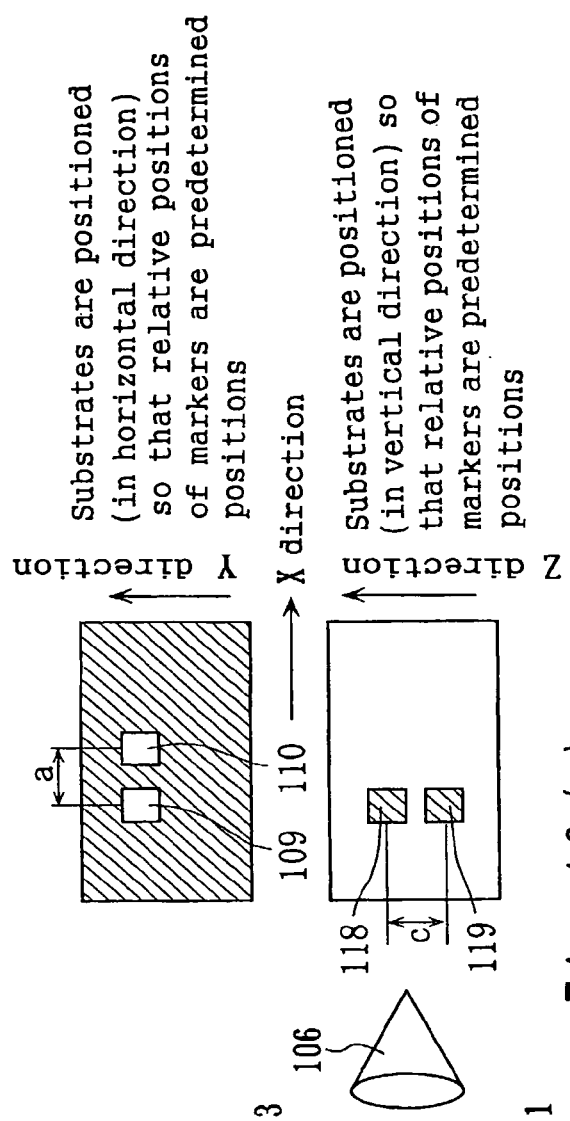
FIGS. 13(*a*) to 13(*c*) are schematic views showing a modified method of manufacturing the three-dimensional optical waveguide of the present invention.

While in the present embodiment, the light source 105 is disposed below the waveguide substrate 1 when position alignment between the waveguide substrate 1 and the lens substrate 3 is performed, the light source 105 may be disposed at a side of the waveguide substrate 1 and the lens substrate 3 as shown in FIG. 13(a). In that case, at the parts not coinciding with the bottom surfaces 102 of the markers 101, the parallel light emitted from the light source 105 is transmitted to the opposite side of the waveguide substrate 1 and the lens substrate 3 as it is to reach the light receiver 106 disposed at a side of the waveguide 1 and the lens substrate 3, and at the parts coinciding with the bottom surfaces 102 of the markers 101, part of the parallel light is reflected upward to reach the light receiver 106 disposed above the lens substrate 3.

Consequently, as the images obtained on the light receiver 106 disposed above the lens substrate 3, as shown in FIG. 13(b), an image 109 corresponding to the marker 101 of the lens substrate 3 and an image 110 corresponding to the marker 101 of the waveguide substrate 1 are shown on the light receiver 106 as parts brighter than the peripheral part. As described above, when the light source 105 is disposed at a side of the waveguide substrate 1 and the lens substrate 3, the waveguide substrate 1 and the lens substrate 3 can be positioned in predetermined positions in the horizontal direction by adjusting the spacing a between the image 109 and the image 110 similar to the above-described case.

FIG. 13(c) shows images obtained from the light receiver 106 disposed at a side of the waveguide substrate 1 and the lens substrate 3 as described above. Here, an image 118 corresponds to the marker 101 formed in the lens substrate 3, and an image 119 corresponds to the marker 101 formed in the waveguide substrate 1. These images are shown on the light receiver 106 as parts darker than the peripheral part. Then, adjustment is made by moving the waveguide 1 and the lens substrate 3 in the Z direction so that the spacing between the image 118 and the image 119 is the predetermined spacing c. When the elements are brought into predetermined position alignment, the waveguide 1 and the lens substrate 3 are bonded together similar to the above-described case.

While the concave markers 101 are used for the positioning of the substrates in the description given above, convex markers 103 may be used for the positioning. FIG. 11(d) shows a case where the bottom surface 104 of the convex marker 103 is angled at 45°. FIG. 11(e) shows a case where the bottom surface 104 of the convex marker 103 has a scattering surface. FIG. 11(f) shows a case where the bottom surface 104 of the convex marker 103 has a lens configuration.

When these convex markers 103 are used, the horizontal positions and the vertical positions of the substrates can be adjusted similarly to the case of the concave markers 101 with the spacing between each substrate being fixed by a spacer (not shown) or filled with an adhesive as described above and with the light source 105 being disposed below or at a side of the waveguide 1.

While in the description given above, the bottom surfaces of the markers 101 and 103 are angled at 45°, they may be angled at a different angle. In that case, by disposing the light receiver 106 so that the light from the light source 105 is projected onto the light receiver 106 upward or downward in a slanting direction with respect to the substrates, the spacing between each substrate can be similarly adjusted by observing the images shown on the light receiver 106.

While in the description given above, the markers 101 and 103 of which bottom surfaces are inclined are used to perform the positioning of the substrates in the horizontal direction and the vertical direction, it is considered to use markers 101 having bottom surfaces 102 of a different configuration.

FIGS. 14(*a*) and 15(*a*) show examples of arrangement of the elements in a case where markers 101 of which bottom surfaces 102 have a lens configuration are used. As shown in FIG. 14(*a*), a light source 111 is a diffusing light source, and is disposed below the waveguide substrate 1 at a predetermined distance therefrom. The light receiver 106 is disposed above the lens substrate 3. In the waveguide substrate 1, a concave marker 101 having a bottom surface 102 of a lens configuration being concave when viewed from below is disposed, and in the lens substrate 3, a concave marker 101 having a bottom surface 102 of a lens configuration being convex when viewed from below is disposed. Here, the concave lens of the bottom surface 102 formed in the waveguide substrate 1 has a lens configuration and a refractive index that refract into parallel light the diffused light emitted from the light source 111 disposed at the predetermined distance from the waveguide substrate 1.

The lens configuration as a convex lens and the refractive index of the bottom surface 102 formed in the lens substrate 103 are a lens configuration and a refractive index that condense the parallel light incident on the bottom surface 102 of the lens substrate 3 on the light receiver 106 disposed above the lens substrate 3. The positions of markers 101 of the substrates are the same both in the X direction and in the Y direction, or are predetermined positions. In this arrangement, when light is emitted from the light source 111, the light passes through the marker 101 of the waveguide substrate 1 and the marker 101 of the lens substrate 3 to be condensed on the light receiver 106. The images obtained from the light receiver 106 at this time are shown in FIG. 14(*b*). That is, on the light receiver 106, an image 112 which is an image of the marker 101 itself is formed and an image 113 condensed by the bottom surface 102 having a lens configuration is formed inside the image 112. As described above, by adjusting the waveguide substrate 1 or the lens substrate 3 in the horizontal direction so that the image 113 is formed inside the image 112, positioning of the waveguide substrate 1 and the lens substrate 3 in the horizontal direction can be performed.

By adjusting the spacing between the waveguide substrate 1 and the lens substrate 3 so that the outside diameter of the image 113 on the light receiver 106 is a predetermined value (that is, so that the light emitted from the light source 111 is most excellently condensed on the light receiver 106), adjustment (positioning in the vertical direction) of the spacing between the waveguide substrate 1 and the lens substrate 3 can be made. While in the FIG. 14(*b*), the two images 112 and 113 are situated side by side, these are images formed when another markers 101 of the same type are disposed so as to be situated side by side on the substrates. The markers 101 may be disposed one by one on each of the substrates as shown in FIG. 14(*a*).

FIG. 15(*a*) shows a modification of the structure of FIG. 14(*a*). In this case, the bottom surface 102 of the marker 101 formed in the waveguide substrate 1 has a lens configuration being convex when viewed from below. The lens configurations as convex lenses and the refractive indices of the bottom surface 102 formed in the waveguide substrate 1 and the bottom surface 102 formed in the lens substrate 3 are lens configurations and refractive indices that condense the light emitted from the light source 111 on the light receiver 106 disposed above the lens substrate 3 by way of the bottom surface 102 of the waveguide substrate 1 and the bottom surface 102 of the lens substrate 3. On the light receiver 106, images 114 and 115 are similarly formed as shown in FIG. 15(*b*), and the positioning of the waveguide substrate 1 and the lens substrate 3 in the horizontal and the vertical directions can be performed similarly to the above-described case.

While FIGS. 14(*a*), 14(*b*), 15(*a*) and 15(*b*) are described with reference to examples using the concave markers 101, the above-described applies to cases where convex markers 101 are used as shown in FIG. 11(*f*).

Figure 16B:
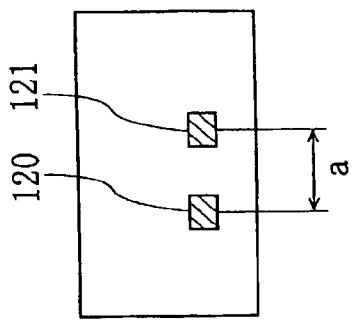
FIGS. 16(*a*) and 16(*b*) are schematic views showing yet another method of manufacturing the three-dimensional optical waveguide of the present invention.
Figure 16A:
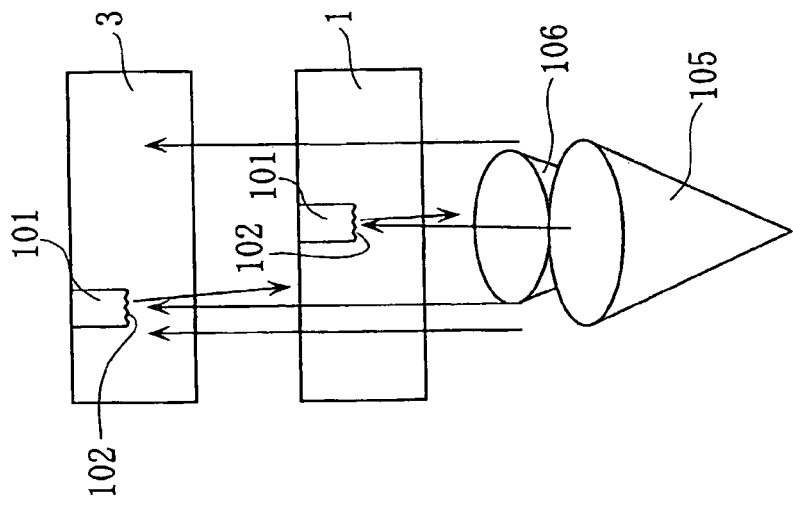

FIGS. 16(*a*) and 16(*b*) show a case in which the bottom surfaces 102 of the markers 101 are scattering surfaces (see FIG. 11(*b*)). In this case, as shown in FIG. 16(*a*), the light receiver 106 and the light source 105 are disposed below the waveguide substrate 1 so as to adjoin each other. When parallel light is emitted from the light source 105 in this arrangement, the light is scattered at the scattering surfaces of the bottom surfaces 102 of the markers 101, and part of the scattered light reaches the light receiver 106 disposed below the waveguide substrate 1. FIG. 16(*b*) shows images light-received on the light receiver 106. Here, an image 120 corresponds to the marker 101 formed in the lens substrate 3, and an image 121 corresponds to the marker 101 formed in the waveguide substrate 1. By adjusting the distance between the image 120 and the image 121 so as to be the predetermined spacing a, positioning of the substrates in the horizontal direction can be performed.

FIGS. 17(*a*) to 17(*d*) show a case where the bottom surfaces 102 of the markers 101 are inclined scattering surfaces. In this case, as shown in FIG. 17(*a*), the light receiver 106 can be disposed below the waveguide substrate 1, at a side of the waveguide substrate 1 and the lens substrate 3 or above the lens substrate. In this arrangement, the horizontal positions or the vertical positions of the substrates can be adjusted by applying light from the light source 105 disposed below the waveguide substrate 1.

For example, by disposing the light receiver 106 above the lens substrate 3 and at a side of the waveguide substrate 1 and the lens substrate 3, positioning of the substrates in the horizontal direction and positioning thereof in the vertical direction can be performed at the same time like in the case shown in FIGS. 12(*a*) to 12(*c*). Moreover, by disposing the light receiver 106 below the waveguide substrate 1 and at a side of the waveguide substrate 1 and the lens substrate 3, positioning of the substrates in the horizontal direction and positioning thereof in the vertical direction can also be performed at the same time. FIG. 17(*b*) shows images shown on the light receiver 106 disposed above the lens substrate 3. An image 122 corresponds to the marker 101 formed in the lens substrate 3, and an image 123 corresponds to the marker 101 formed in the waveguide substrate 1. FIG. 17(*c*) shows images shown on the light receiver 106 disposed at a side of the lens substrate 3 and the waveguide substrate 1. An image 124 corresponds to the marker 101 formed in the lens substrate 3, and an image 125 corresponds to the marker 101 formed in the waveguide substrate 1. FIG. 17(*d*) shows images shown on the light receiver 106 disposed below the waveguide substrate 1. An image 126 corresponds to the marker 101 formed in the lens substrate 3, and an image 127 corresponds to the marker 101 formed in the waveguide substrate 1.

As described above, when the bottom surfaces of the markers 101 are inclined scattering surfaces, since the light receiver 106 can be disposed in three directions with respect to the substrates, there is flexibility in the positioning method. For example, positioning can be performed even when the laminated substrates do not transmit light as described later. Positioning can be more precisely performed by making the adjustment while observing the light receivers 106 disposed in the three directions at the same time.

Moreover, it is considered that the bottom surfaces 102 of the markers 101 are inclined lens surfaces. In that case, as shown in FIGS. 18(*a*) and 18(*b*), the light receiver 106 is disposed so as to be shifted from the optical axis of the light source 105.

Moreover, it is considered that the bottom surfaces 102 of the markers 101 are lens surfaces having scattering surfaces.

While in the description given above, the markers 101 formed in the substrates are a combination of markers 101 of the same kind, positioning may be performed with a combination of markers 101 of different kinds. For example, positioning may be performed by forming in one substrate a marker 101 of which bottom surface 102 is inclined and forming in the other substrate a marker 101 of which bottom surface 102 has a scattering surface. Moreover, positioning may be performed by forming in one substrate a marker 101 of which bottom surface 102 is inclined and forming in the other substrate a marker 101 of which bottom surface 102 has a lens surface. Moreover, positioning may be performed by forming in one substrate a marker 101 of which bottom surface 102 has a scanning surface and forming in the other substrate a marker 101 of which bottom surface 102 has a lens surface. When a marker 101 having a lens surface is combined, the light emitted from the light source 105 is not necessarily strictly parallel.

While in the description given above, the method of positioning of the substrates is described as a case where positioning of the waveguide substrate 1 and the lens substrate 3 is performed, it is similarly applicable to a case where positioning of other substrates (that is, the planar substrates of the present invention) is performed.

While in the description given above, positioning is performed by applying light from below the substrates, it is considered to apply light from above the substrates. For example, as shown in FIG. 1, when under a condition where the waveguide substrate 1, the lens substrate 3, the isolator substrate 8 and the lens substrate 10 are laminated, the waveguide substrate 12 is further laminated on the lens substrate 10 and positioning of the lens substrate 10 and the waveguide substrate 11 is performed, the light source 105 and the light receiver 106 are disposed above the waveguide substrate 11 and the light receiver 106 is disposed at a side of the lens substrate 10 and the waveguide substrate 11. At this time, markers 101 of which bottom surfaces 102 are inclined scattering surfaces are used. When light is applied from above the waveguide substrate 11, at the part where the markers 101 are absent, the light is reflected by the isolator substrate 11, and at the part where the markers 101 are present, the light is reflected sideward. Consequently, on the light receiver 106 disposed above the waveguide substrate 11, images similar to those shown in FIG. 12(*b*) are projected. On the light receiver 106 disposed at a side of the waveguide substrate 11, images similar to those shown in FIG. 12(*c*) are projected. By doing this, positioning of the substrates in the horizontal direction and positioning thereof in the vertical direction can be performed at the same time by applying light from above the substrates.

Second Embodiment

Next, a second embodiment of the present invention will be described with reference to FIG. 3.

Figure 3:
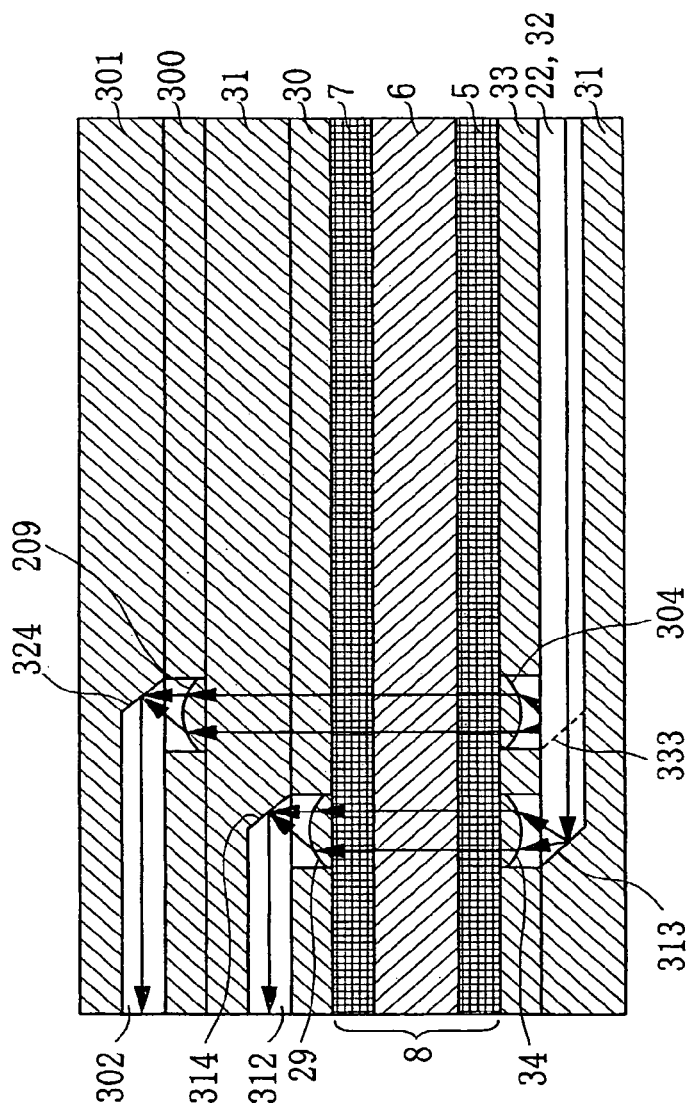
FIG. 3 is a cross-sectional view showing the structure of a three-dimensional optical waveguide according to a second embodiment of the present invention.

In the three-dimensional optical waveguide shown in FIG. 3, a waveguide substrate 31 has two waveguides 22 and 32. Here, the waveguide 32 is disposed on the farther side from the plane of FIG. 3 so as to be parallel to the waveguide 22. The waveguide 22 has a reflecting surface 313 at its end, and the waveguide 32 has a reflecting surface 333 at its end. The lens substrate 33 has a lens 34 corresponding to the reflecting surface 313 and a lens 304 corresponding to the reflecting surface 333.

Above the isolator substrate 8, a lens substrate 30 having a lens 29 corresponding to the lens 34 is laminated, and above the lens substrate 30, a waveguide substrate 31 is laminated having a waveguide 312 and a reflecting surface 314 disposed at an end of the waveguide 312 and corresponding to the lens 29. Above the waveguide substrate 31, a lens substrate 300 having a lens 209 corresponding to the lens 304 is laminated, and above a lens substrate 300, a waveguide substrate 301 is laminated having a waveguide 302 and a reflecting surface 324 disposed at an end of the waveguide 302 and corresponding to the lens 209.

Here, the reflecting surfaces 313 and 333 are angled at 45° like the reflecting surface 13 in the first embodiment, and the reflecting surfaces 314 and 324 are angled 45° like the reflecting surface 14 in the first embodiment. Like in the first embodiment, the horizontal positions of the reflecting surface 313, the lens 34, the lens 29 and the reflecting surface 314 are aligned in the vertical direction, and the horizontal positions of the reflecting surface 333, the lens 304, the lens 209 and the reflecting surface 324 are aligned in the vertical direction.

Here, positioning of the waveguide substrate 31 and the lens substrate 33, positioning of the lens substrate 33 and the lens substrate 30, positioning of the lens substrate 30 and the waveguide substrate 31, positioning of the waveguide substrate 31 and the lens substrate 300 and positioning of the lens substrate 300 and the waveguide substrate 301 are performed similarly to the first embodiment (the same applied to the embodiments described below).

By structuring the three-dimensional optical waveguide as described above, the lights directed into the waveguides 22 and 32 of the waveguide substrate 31 are directed to the waveguides 312 and 302, respectively, by an action similar to that of the first embodiment. As described above, by laminating the planar substrates of the present invention and three-dimensionally forming two waveguides, a low-cost and high-performance three-dimensional optical waveguide not requiring a complicated adjustment is provided.

Figure 4:
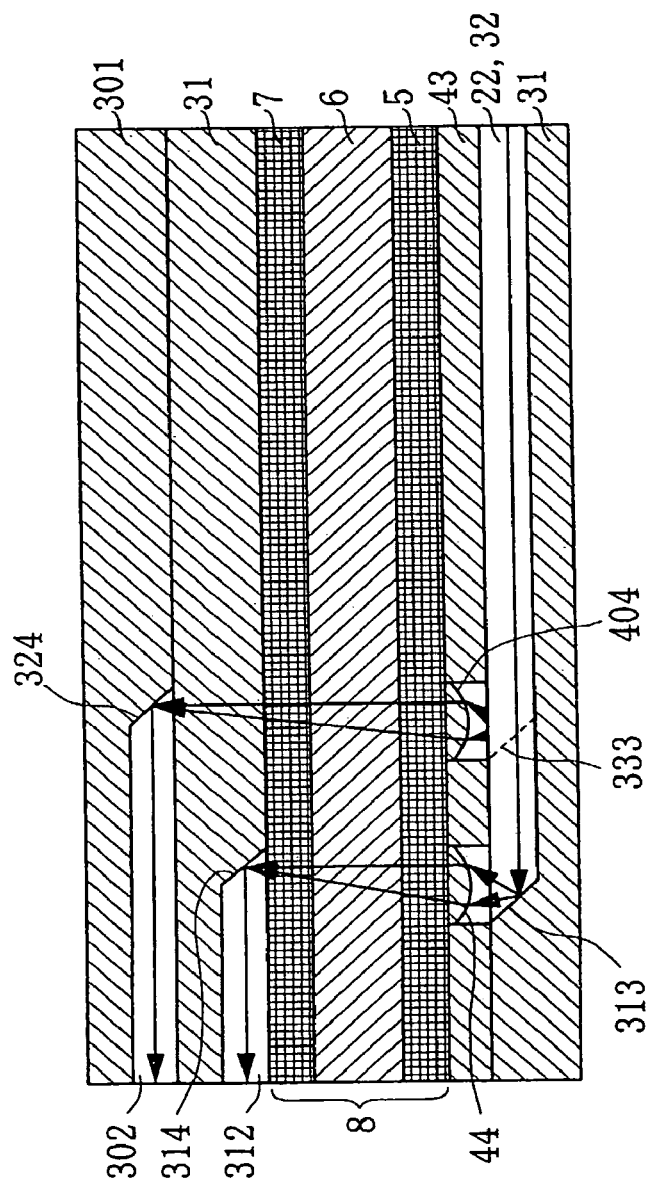
FIG. 4 is a cross-sectional view showing the structure of a three-dimensional optical waveguide according to a modification of the second embodiment of the present invention.

While in the second embodiment, the lens substrate 30 is present between the isolator substrate 8 and the waveguide substrate 31 and the lens substrate 300 is present between the waveguide substrate 31 and the waveguide substrate 301, when it is possible that the light reflected by the reflecting surface 313 is condensed on the reflecting surface 314 only by the lens 44 and the light reflected by the reflecting surface 333 is condensed on the reflecting surface 324 only by the lens 404 as shown in FIG. 4, the lens substrates 30 and 300 are unnecessary. In that case, similar effects to those described above are obtained.

While in the second embodiment, the waveguide 32 is disposed on the farther side from the plane of FIG. 3 so as to be parallel to the waveguide 22, the arrangement of the waveguides 22 and 32 is not limited thereto. Similar effects to those described above are obtained from any arrangement as long as the waveguides 22 and 32 are separately disposed on the same waveguide substrate 31 and the lights directed thereinto are directed to the other waveguides 312 and 302, respectively.

The waveguides 22 and 32 are not necessarily present on the same waveguide substrate 31 but may be present on different laminated waveguide substrates, and the waveguides 312 and 302 are not necessarily present on the waveguide substrates 31 and 301 but may be present on the same waveguide substrate. In these cases, similar effects to those described above are obtained.

Third Embodiment

Figure 5:
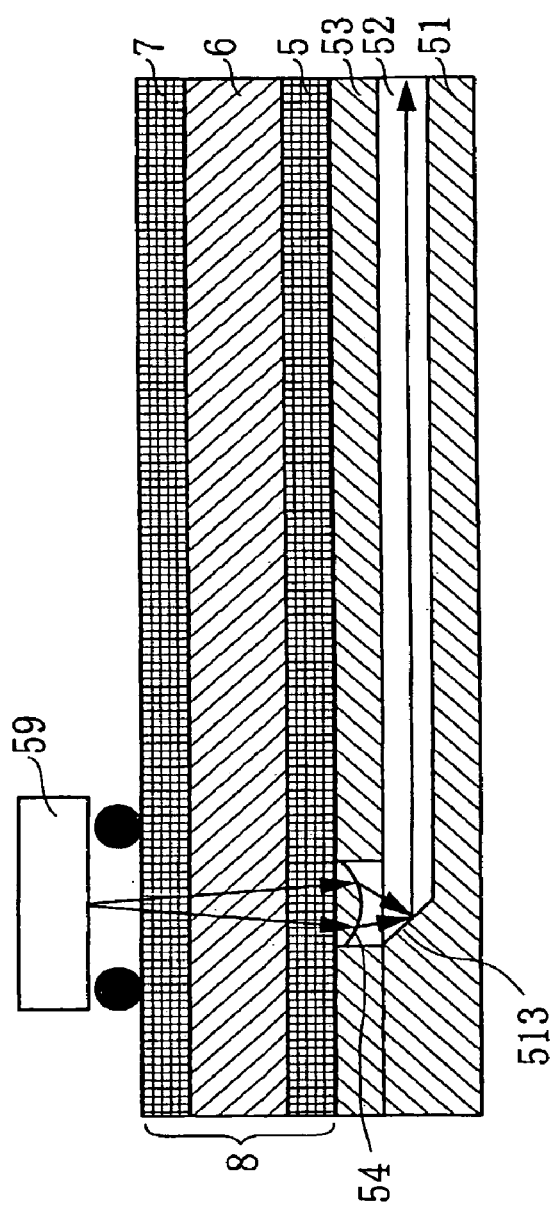
FIG. 5 is a cross-sectional view showing the structure of a three-dimensional optical waveguide according to a third embodiment of the present invention.

FIG. 5 shows the structure of a three-dimensional optical waveguide according to a third embodiment of the present invention.

In the three-dimensional optical waveguide of the present embodiment, a surface emitting laser (VCSEL) 59 which is the light emitting element of the present invention is disposed above the isolator substrate 8, and a reflecting surface 513, a lens 54 and the surface emitting laser 59 are disposed so that the horizontal positions thereof are aligned in the vertical direction. Here, the structure of the part constituted by a waveguide substrate 51, a lens substrate 53 and the isolator substrate 8 is similar to that of the first embodiment, and description thereof is omitted.

According to the above-described structure, the laser beam emitted from the surface emitting laser 59 passes through the isolator substrate 8 and the lens 54 to be directed to the waveguide 52 of the waveguide substrate 51. By doing this, a low-cost and high-performance three-dimensional optical waveguide not requiring a complicated adjustment is provided.

While in the third embodiment, the isolator substrate 8 is present between the lens substrate 53 and the surface emitting laser 59, the isolator substrate 8 is not necessarily present. In that case, similar effects to those described above are obtained.

Figure 6:
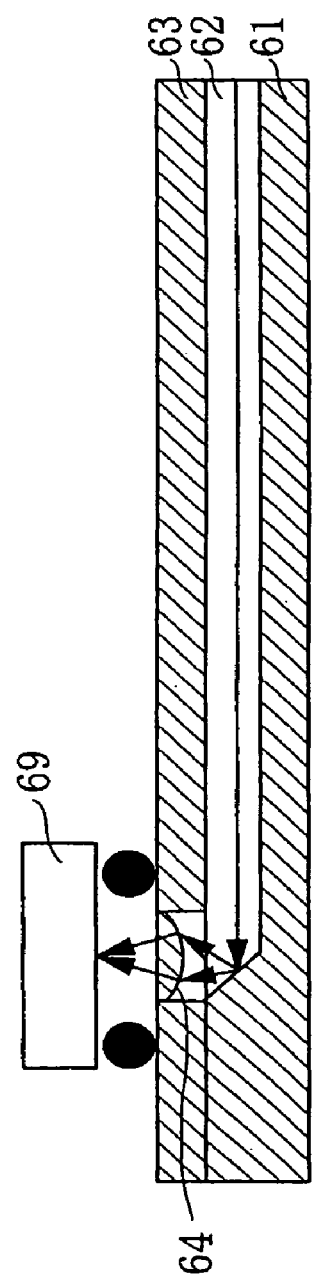
FIG. 6 is a cross-sectional view showing the structure of a three-dimensional optical waveguide according to a modification of the third embodiment of the present invention.

While the above description is given with reference to an example in which the surface emitting laser 59 is disposed above the isolator substrate 8, as shown in FIG. 6, a surface-mount photodiode 69 which is the light receiving element of the present invention may be disposed instead of the surface emitting laser 59. FIG. 6 shows a three-dimensional optical waveguide comprising a waveguide substrate 61 having a waveguide 62, a lens substrate 63 having a lens 64 and the surface-mount photodiode 69. Here, the structure of the waveguide substrate 61 and the lens substrate 63 is similar to the above-described structure, and description thereof is omitted. In the structure shown in FIG. 6, the isolator substrate 8 may be laminated between the lens substrate 63 and the surface-mount photodiode 69.

Fourth Embodiment

Figure 7:
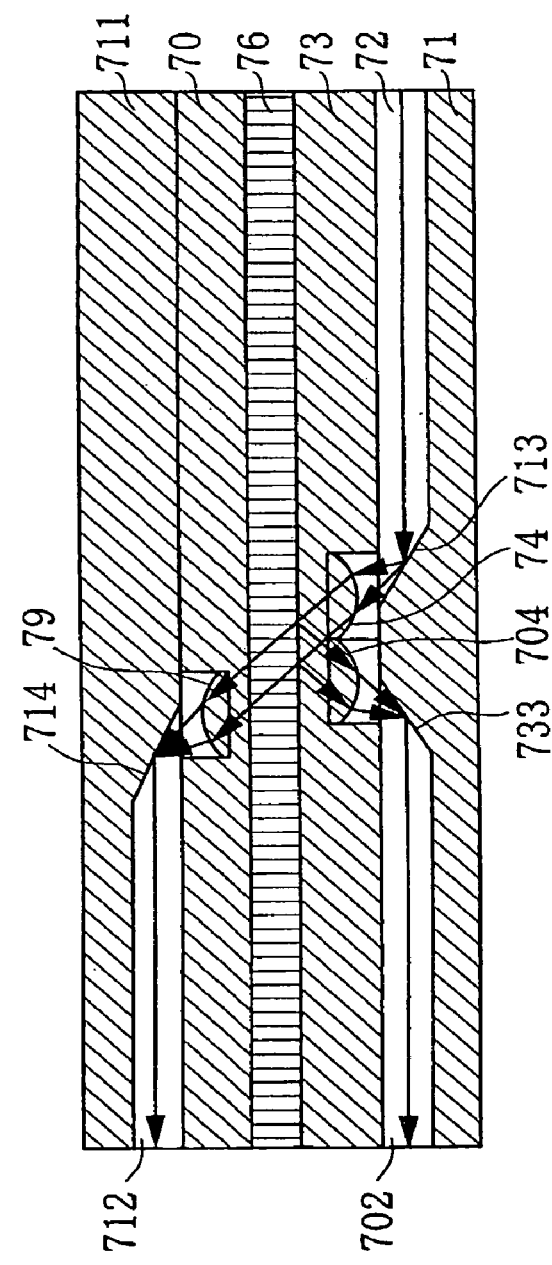
FIG. 7 is a cross-sectional view showing the structure of a three-dimensional optical waveguide according to a fourth embodiment of the present invention.

FIG. 7 shows the structure of a three-dimensional optical waveguide according to a fourth embodiment of the present invention.

In the three-dimensional optical waveguide of the fourth embodiment, a waveguide substrate 71 has a waveguide 72, and a waveguide 702 in a direction opposed to the waveguide 72. At an end of the waveguide 72, a reflecting surface 713 is formed, and at an end of the waveguide 702, a reflecting surface 733 is formed. Here, the reflecting surfaces 713 and 733 are formed so as to be opposed to each other and each angled at approximately 22.5° from the horizontal plane in a direction that forms a slope of a trapezoidal shape. On a lens substrate 73 laminated above the waveguide substrate 71, a lens 74 and a lens 704 are formed integrally with the lens substrate 73 so as to adjoin each other.

Above the lens substrate 73, a wavelength division multiplexing filter 76 which is the planar substrate having a filter layer of the present invention is laminated, and above the wavelength division multiplexing filter 76, a lens substrate 70 having a lens 79 is laminated. Above the lens substrate 70, a waveguide substrate 711 is laminated having a waveguide 712 and a reflecting surface 714 formed at an end of the waveguide 712. Here, the reflecting surface 714 is angled at approximately 22.5° from the horizontal plane. When viewed from the reflecting surface 713, the lens 74, the lens 79 and the reflecting surface 714 are aligned so as to be inclined toward the upper left by 45° from the horizontal plane. When viewed from the reflecting surface 733, the lens 704 is inclined by 45° from the horizontal direction in a direction slanting upward toward the right.

The operation of the three-dimensional optical waveguide structured as described above will be described next.

The light traveling leftward in the horizontal direction through the waveguide 72 is reflected upward by the reflecting surface 713 at 45° from the horizontal travel direction, and passes through the lens 74. Part of the light having passed through the lens 74 passes through the wavelength division multiplexing filter 76 (that is, is sorted out by the wavelength division multiplexing filter), reaches the reflecting surface 714 through the lens 79 to be reflected in the horizontal direction, and travels leftward through the waveguide 712. The light including the remaining wavelength component sorted out by the wavelength division multiplexing filter 76 is reflected at 45° from the horizontal direction in a direction slanting downward toward the left at the interface between the lens substrate 73 and the wavelength division multiplexing filter 76, is reflected by the reflecting surface 733 through the lens 704, and travels leftward in the horizontal direction through the waveguide 702.

As described above, according to the three-dimensional optical waveguide of the present embodiment, the light incident on the waveguide 72 can be extracted after being separated between light traveling through the waveguide 712 and light traveling through the waveguide 702 according to the wavelength component.

In the present embodiment, when it is possible that light is sufficiently condensed on the reflecting surface 714 by the lens 74, the lens substrate 70 is unnecessary. In that case, similar effects to those described above are obtained.

Figure 8:
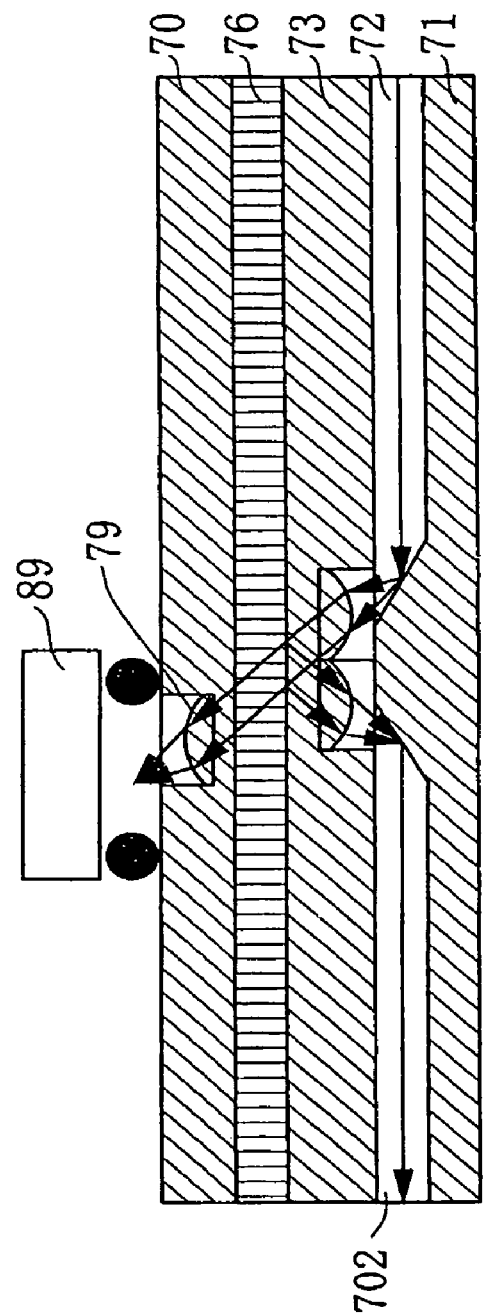
FIG. 8 is a cross-sectional view showing the structure of a three-dimensional optical waveguide according to a modification of the fourth embodiment of the present invention.

FIG. 8 shows a modification of the present embodiment. In this modification, above the lens substrate 70, a surface-mount photodiode 89 is disposed instead of laminating the waveguide substrate 711. By doing this, it is possible that, of the light incident on the waveguide 72, only the light of the wavelength component sorted out by the wavelength division multiplexing filter 76 is directed into the surface-mount photodiode 89 and the light of the wavelength component not sorted out by the wavelength division multiplexing filter 76 is directed into the other waveguide 702.

When the three-dimensional optical waveguide of the present embodiment is formed, positioning of the substrates is performed by applying light from above the three-dimensional optical waveguide as required. For example, in a case where positioning of the waveguide substrate 711 is performed under a condition where the waveguide substrate 71, the lens substrate 73, the wavelength division multiplexing filter 76 and the lens substrate 70 are laminated as shown in FIG. 7, when the wavelength of the light emitted from the light source 105 does not pass through the wavelength division multiplexing filter 76, the light source 105 is disposed above the waveguide substrate 711, and positioning of the waveguide substrate 711 is performed by applying light from above by a method similar to that described in the first embodiment.

Fifth Embodiment

Figure 9:
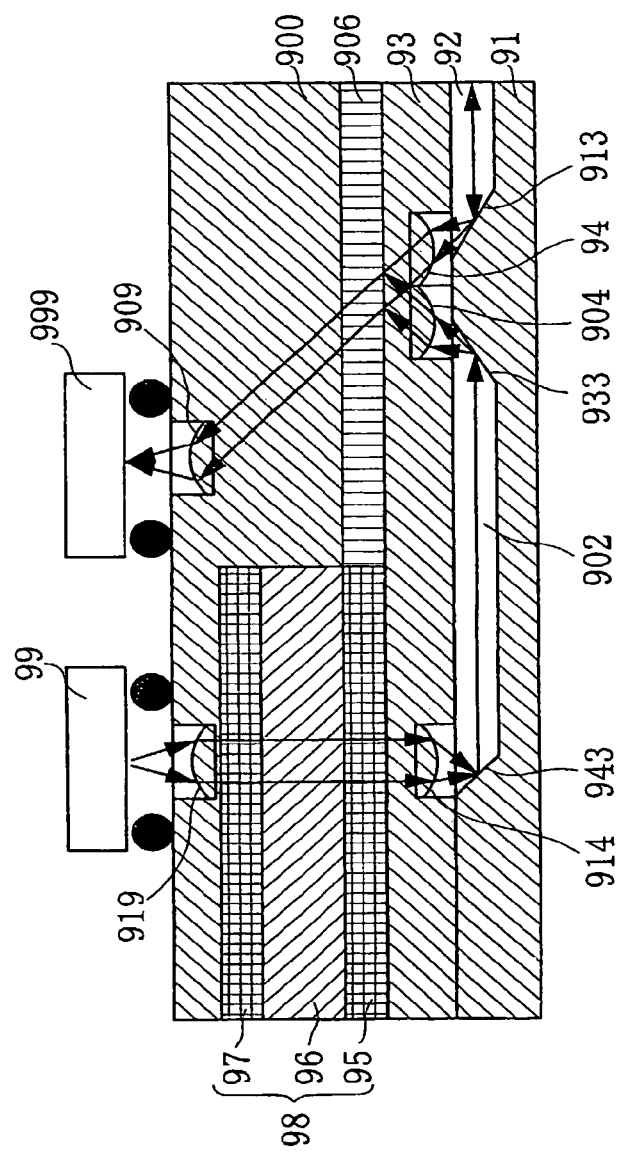
FIG. 9 is a cross-sectional view showing the structure of a three-dimensional optical waveguide according to a fifth embodiment of the present invention.

FIG. 9 shows the structure of a three-dimensional optical waveguide of the present invention according to a fifth embodiment.

The three-dimensional optical waveguide of the present embodiment has on the left side thereof a three-dimensional optical waveguide where a lens substrate 900 having a lens 919 is laminated above the three-dimensional optical waveguide shown in the third embodiment (FIG. 5), and has on the right side thereof the three-dimensional optical waveguide shown in the fourth embodiment (FIG. 8). Here, the thickness of the lens substrate 900 is different between the left side and the right side thereof. The thickness of the right side of the three-dimensional optical waveguide of the present embodiment is larger than that of the left side by the thickness of a Faraday rotator 96 and the thickness of a polarizer 97. Moreover, a wavelength division multiplexing filter 906 is designed so as to reflect the wavelength of the light emitted from a surface emitting laser 99 and transmit the wavelength of the light incident from a waveguide 92. The elements other than these are similar to those of the third and the fourth embodiments, and description thereof is omitted.

In the three-dimensional optical waveguide having such a structure, the light traveling leftward through the waveguide 92 is reflected upward by a reflecting surface 913 at 45° from the horizontal travel direction, passes through a lens 94, the wavelength division multiplexing filter 906 and a lens 909, and reaches a surface-mount photodiode 999. The light emitted from the surface emitting laser 99 passes downward through the lens 919, an isolator substrate 98 and a lens 914, is reflected rightward in the horizontal direction by a reflecting surface 943, and is then reflected upward by a reflecting surface 933 in a direction 45° from the direction of travel. The light reflected by the reflecting surface 933 passes through a lens 904, is reflected at 45° in a direction slanting downward toward the right at the interface between the wavelength division multiplexing filter 906 and a lens substrate 93, passes through the lens 94, and reaches the reflecting surface 913. The light reflected rightward in the horizontal direction by the reflecting surface 913 travels rightward through the waveguide 92.

As described above, according to the present embodiment, a low-cost and high-performance three-dimensional optical waveguide is provided that does not require a complicated adjustment although having a complicated structure.

Sixth Embodiment

Figure 10:
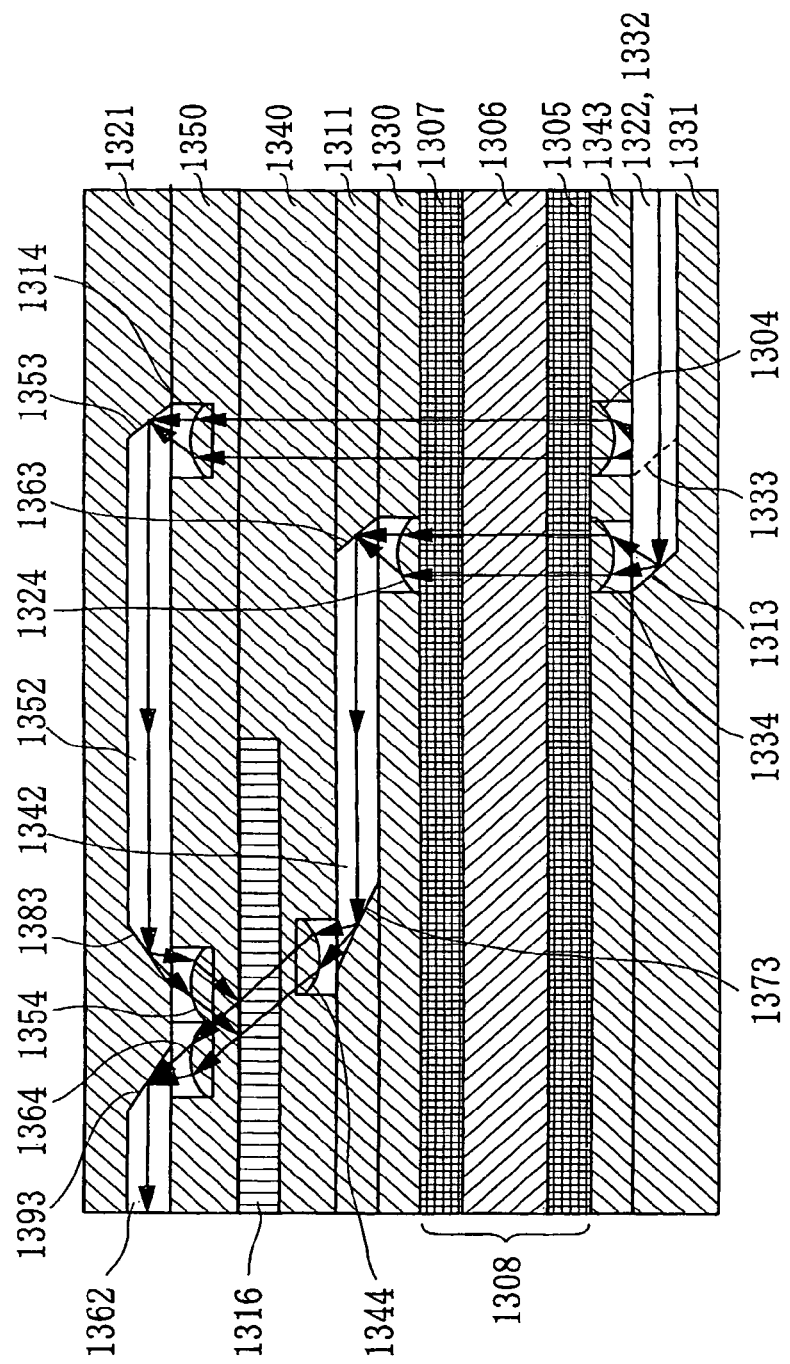
FIG. 10 is a cross-sectional view showing the structure of a three-dimensional optical waveguide according to a sixth embodiment of the present invention.

FIG. 10 shows the structure according to a sixth embodiment of the present invention.

The structure of the right side of the three-dimensional optical waveguide shown in FIG. 10 is similar to the structure of the three-dimensional optical waveguide shown in the second embodiment (FIG. 3), and description thereof is omitted. The structure of the left side of the three-dimensional optical waveguide shown in FIG. 10 is one obtained by vertically and horizontally reversing the structure of the three-dimensional optical waveguide shown in the fourth embodiment (FIG. 7). Here, a wavelength division multiplexing filter 1316 which is an example of the wavelength division multiplexing filter of the present invention is set so as to transmit light of a wavelength $\lambda 1$ and not to transmit light of a wavelength $\lambda 2$.

In the three-dimensional optical waveguide having such a structure, when lights of the different wavelengths $\lambda 1$ and $\lambda 2$ are directed into waveguides 1322 and 1332, respectively, the light of the wavelength $\lambda 1$ directed into the waveguide 1322 reaches a reflecting surface 1373 through a reflecting surface 1313, a lens 1334, an isolator substrate 1308, a lens 1324, a reflecting surface 1363 and a waveguide 1342. The light reflected by the reflecting surface 1373 passes through a lens 1344, the wavelength division multiplexing filter 1316 and a lens 1364, is reflected by a reflecting surface 1393, and reaches a waveguide 1362.

The light of the wavelength $\lambda 2$ directed into the waveguide 1332 reaches a reflecting surface 1383 through a reflecting surface 1333, a lens 1304, the isolator substrate 1308, a lens 1314 and a reflecting surface 1353. The light reflected by the reflecting surface 1383 is incident, through a lens 1354, on the wavelength division multiplexing filter 1316 from the upper right in a slanting direction. Since the wavelength division multiplexing filter 1316 does not transmit light of the wavelength $\lambda 2$, the light incident from the upper right of the wavelength division multiplexing filter 1316 in a slanting direction is reflected at the interface between the wavelength division multiplexing filter 1316 and a lens substrate 1350, travels in a direction slanting upward toward the left, and is directed into a waveguide 1362 through the lens 1364 and the reflecting surface 1393.

When the lights of the wavelengths $\lambda 1$ and $\lambda 2$ are directed into the waveguides 1322 and 1332 as described above, light having the wavelength components of $\lambda 1$ and $\lambda 2$ is output from the waveguide 1362. As described above, according to the present embodiment, a low-cost and high-performance three-dimensional optical waveguide is provided that does not require a complicated adjustment although having a complicated structure.

Seventh Embodiment

Figure 19:
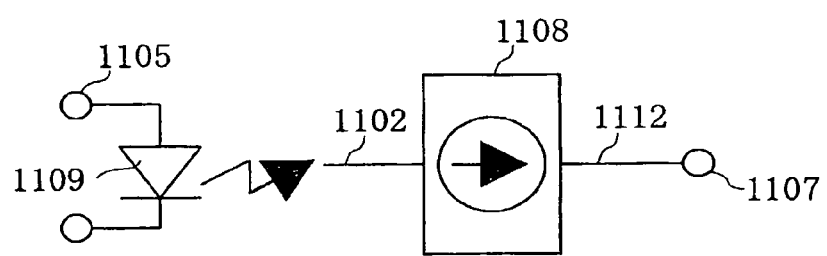
FIG. 19 is a schematic view showing the structure of an optical transmitter module of the present invention.
Figure 25:
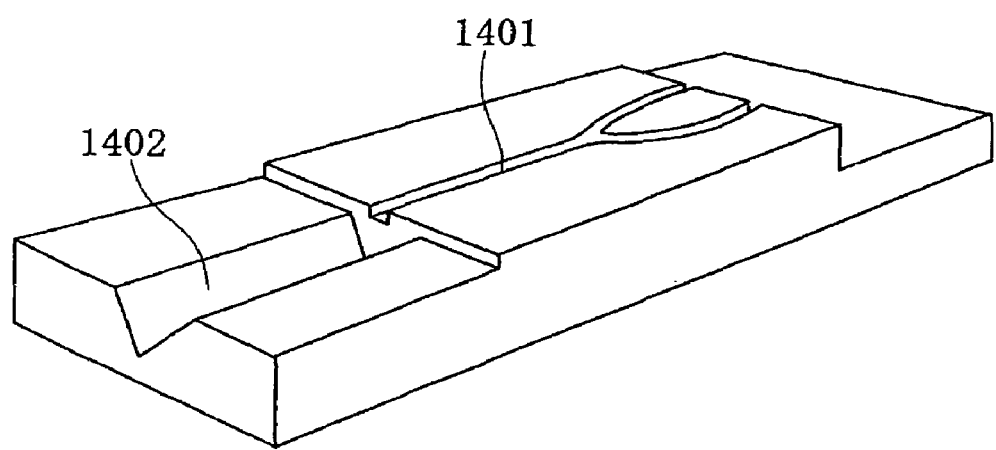
FIG. 25 is a perspective view showing a concrete example of an optical input terminal, an optical output terminal or an optical input and output terminal of the present invention.
Figure 26:
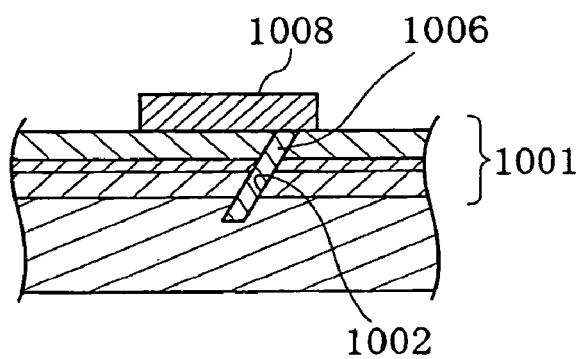
FIG. 26 shows the structure of the waveguide according to the prior art.

Using any of the three-dimensional optical waveguides shown in the above-described embodiments, a module transmitting and receiving light can be formed. FIG. 19 is an example of the structure of such an optical transmitter module. As shown in FIG. 19, to an electric input terminal 1105 which is an example of the electric input terminal of the present invention, a laser diode 1109 which is an example of the light emitting element of the present invention is connected. The laser diode 1109 is connected to a waveguide 1102. The waveguide 1102 is connected to a waveguide 1112 through an isolator 1108. To the waveguide 1112, an optical output terminal 1107 which is an example of the optical output terminal of the present invention is connected. Such an optical transmitter module can be formed, for example, by using the three-dimensional optical waveguide shown in FIG. 1 which is an example of the three-dimensional optical waveguide of the present invention. In this case, the waveguide 1102 in FIG. 19 corresponds to the waveguide 2 shown in FIG. 1, and to an end thereof, the laser diode 1109 (in this case, an edge emitting laser) is attached. The waveguide 1112 in FIG. 19 corresponds to the waveguide 12 shown in FIG. 1, and at an end thereof, for example, a V groove 1042 shown in FIG. 25 is disposed as the optical output terminal 1107, and an optical fiber cable (not shown) is fixed.

By doing this, an optical output can be output from the output terminal 1107 in accordance with the electric signal input to the electric input terminal 1105, so that a low-cost optical transmitter module not requiring a complicated adjustment is provided.

Instead of using the three-dimensional optical waveguide shown in FIG. 1, the three-dimensional optical waveguide shown in FIG. 2 may be used. Moreover, the three-dimensional optical waveguide as shown in FIG. 3 or FIG. 4 may be used. In that case, the two waveguides 22 and 32 correspond to the waveguide 1102, and the two waveguides 312 and 302 correspond to the waveguide 1112. At an end of each of the waveguides 22 and 32, the laser diode 1109 is disposed, and to an end of each of the waveguides 312 and 302, the optical output terminal 1107 is connected. The light emitted from each laser diode 1109 is output from the optical output terminal 1107. Moreover, the three-dimensional optical waveguide shown in FIG. 5 may be used. In that case, the waveguide 1102 is omitted, and as the laser diode 1109, the surface emitting laser 59 is used.

Figure 20:
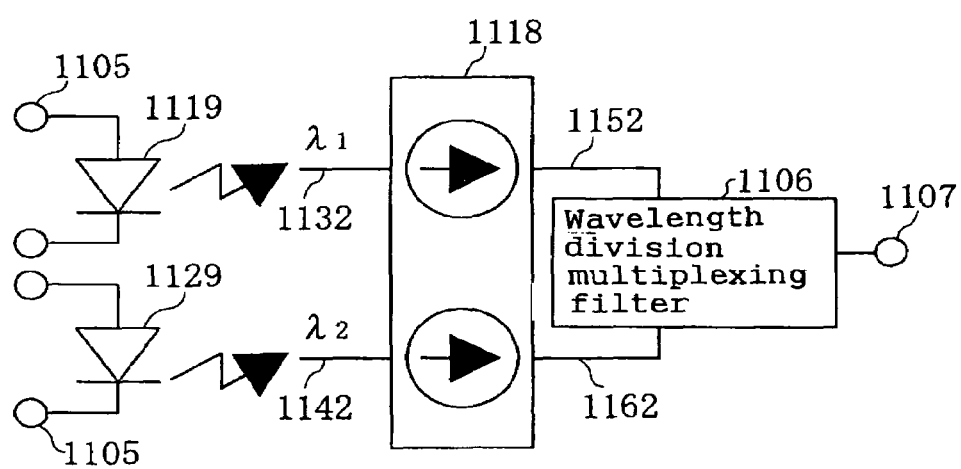
FIG. 20 is a schematic view showing the structure of an optical transmitter module of the present invention.

Moreover, FIG. 20 shows an example of the structure of a wavelength division multiplexing optical transmitter module. The wavelength division multiplexing optical transmitter module shown in FIG. 20 has two laser diodes 1119 and 1129 each having the electric input terminal 1105. To the laser diodes 1119 and 1129, the waveguides 1132 and 1142 are connected, respectively. The waveguides 1132 and 1142 are connected to waveguides 1152 and 1162 through an isolator 1118, respectively. The waveguides 1152 and 1162 are connected to the optical output terminal 1107 through the wavelength division multiplexing filter 1106.

Such a wavelength division multiplexing optical transmitter module can be formed, for example, by using the three-dimensional optical waveguide of the structure shown in FIG. 10. In this case, the laser diode 1119 outputting light of the wavelength λ1 is disposed at an end of the waveguide 1322, and the laser diode 1129 outputting light of the wavelength λ2 is disposed at an end of the waveguide 1332. The output terminal 1107 is disposed at an end of the waveguide 1362.

By doing this, the electric signals input from the two laser diodes 1119 and 1129 can be output as combined with each other as an optical signal.

Eighth Embodiment

Figure 21:
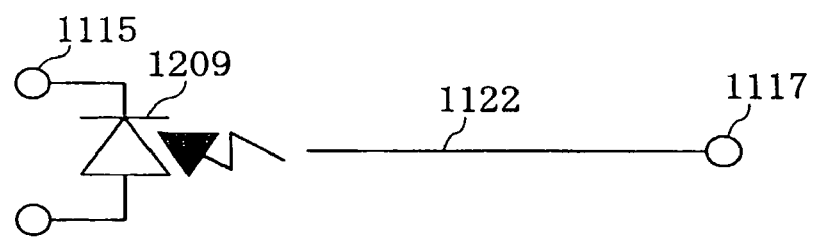
FIG. 21 is a schematic view showing the structure of an optical receiver module of the present invention.

FIG. 21 shows an example of the structure of an optical receiver module. As shown in FIG. 21, an optical input terminal 1117 (for example, the V groove shown in FIG. 25) which is an example of the optical input terminal of the present invention is disposed at an end of a waveguide 1122, and a photodiode 1209 which is an example of the light receiving element of the present invention is connected to the waveguide 1122. To the photodiode 1209, an electric output terminal 1115 which is an example of the electric output terminal of the present invention is connected. Such an optical receiver module can be structured, for example, by using the three-dimensional optical waveguide shown in FIG. 6 which is an example of the three-dimensional optical waveguide. According to the optical receiver module having such a structure, electric output can be obtained from the electric output terminal 1115 in accordance with the optical signal input to the optical input terminal 1117.

Figure 22:
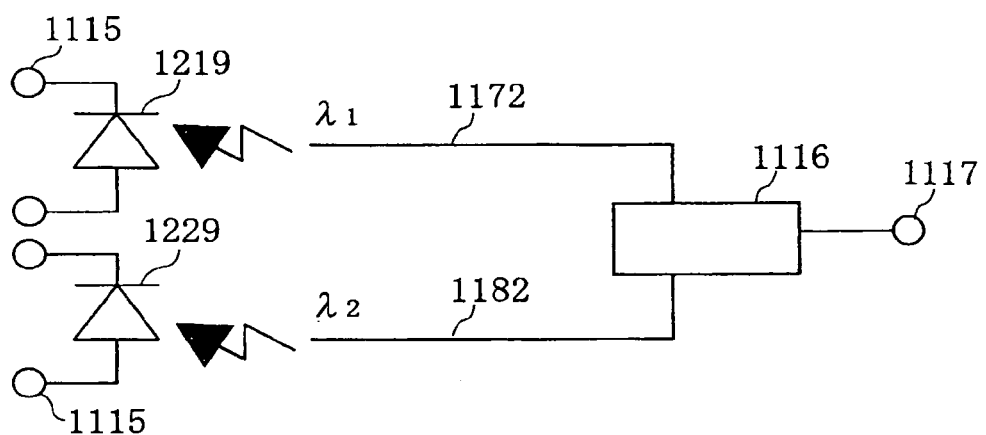
FIG. 22 is a schematic view showing the structure of an optical receiver module of the present invention.

FIG. 22 shows an example of the structure of a wavelength division multiplexing optical receiver module. In this structure example, the optical input terminal 1117 is connected to the wavelength division multiplexing filter 1116, waveguides 1172 and 1182 are connected to the wavelength division multiplexing filter 1116, and photodiodes 1219 and 1229 are connected to the waveguides 1172 and 118, respectively.

Such a wavelength division multiplexing optical receiver module can be structured, for example, by using the three-dimensional optical waveguide shown in FIG. 7. In this case, the optical input terminal 1117 is connected to an end of the waveguide 72, and the photodiodes 1219 and 1229 are connected to ends of the waveguides 712 and 702, respectively. The wavelength division multiplexing filter 76 is set so as to transmit light of the wavelength λ1 and not to transmit light of the wavelength λ2.

In the wavelength division multiplexing optical receiver module having such a structure, when lights of the wavelength λ1 and the wavelength λ2 are directed into the waveguide 71, the light of the wavelength λ1 reaches the photodiode 1219 through the waveguide 712, the light of the wavelength λ2 reaches the photodiode 1229 through the waveguide 702, and in accordance therewith, electric output is output from the electric output terminal 1115 connected to each of the photodiodes 1219 and 1229. That is, an optical signal input from one optical input terminal 1117 can be obtained from each electric output terminal 1115 as two separate electric signals.

The above-described optical transmitter module and optical receiver module can be used as an optical transmission system for transmission and reception by being connected through an optical fiber cable.

Ninth Embodiment

Figure 23:
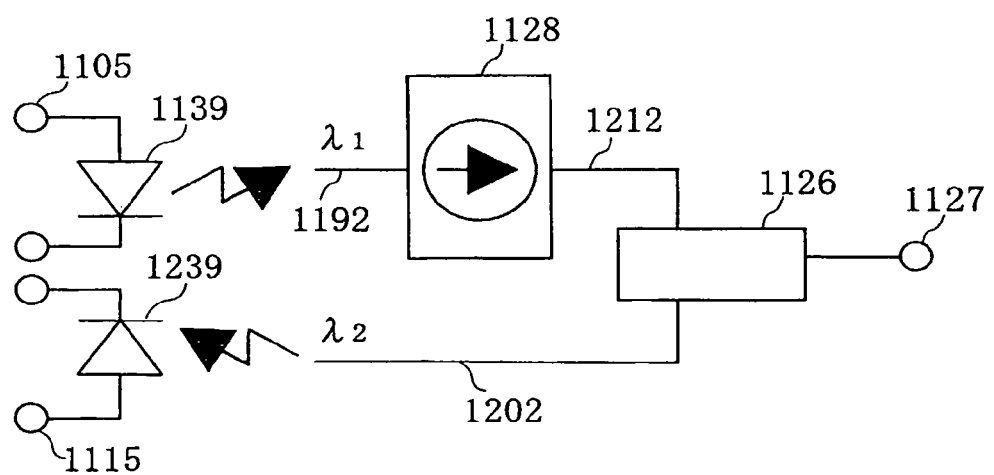
FIG. 23 is a schematic view showing the structure of an optical transmitter and receiver module of the present invention.

FIG. 23 shows an example of the structure of a wavelength division multiplexing optical transmitter and receiver module having both an optical transmission function and an optical reception function. In the structure shown in FIG. 23, a laser diode 1139 having the electric input terminal 1105 and emitting light of the wavelength λ1 is connected to a wavelength division multiplexing filter 1126 which is an example of the wavelength division multiplexing filter of the present invention through a waveguide 1192, an isolator 1128 which is an example of the isolator of the present invention and a waveguide 1212. The photodiode 1239 having the electric output terminal 1115 and receiving light of the wavelength λ2 is connected to the wavelength division multiplexing filter 1126 through a waveguide 1202. To the wavelength division multiplexing filter 1126, an optical input and output terminal 1127 (for example, the V groove shown in FIG. 25) which is an example of the optical input and output terminal of the present invention is connected.

Such a wavelength division multiplexing optical transmitter and receiver module can be structured, for example, by using the three-dimensional optical waveguide shown in FIG. 9. In this case, the optical input and output terminal 1127 is disposed at an end of the waveguide 92. The wavelength division multiplexing filter 906 is set so as not to transmit light of the wavelength λ1 emitted from the surface emitting laser 99 and to transmit light of the wavelength λ2 input to the optical input and output terminal 1127.

According to this structure, the light of the wavelength λ1 emitted from the surface emitting laser 99 is reflected at the interface between the wavelength division multiplexing filter 906 and the lens substrate 93, and is output from the optical input and output terminal 1127 through the waveguide 92. The light of the wavelength λ2 input to the optical input and output terminal 1127 passes through the wavelength division multiplexing filter 906 to reach the surface-mount photodiode 999. According to such a wavelength division multiplexing optical transmitter and receiver module, light can be transmitted and received with only one optical input and output terminal 1127.

Figure 24:
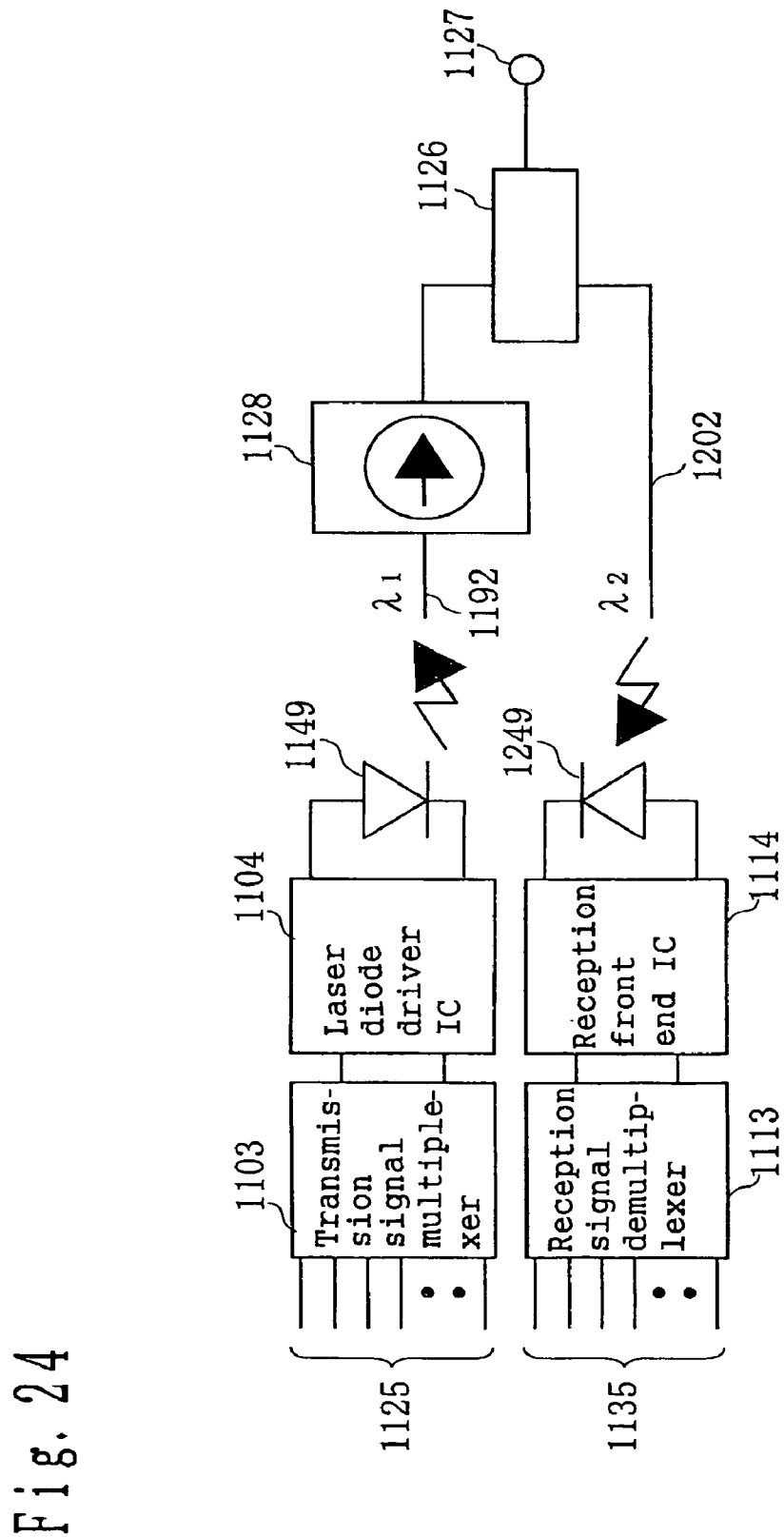
FIG. 24 is a schematic view showing the structure of an application of the optical transmitter and receiver module of the present invention.

FIG. 24 shows an example of a light transmission apparatus using such a wavelength division multiplexing optical transmitter and receiver module. In FIG. 24, to the laser diode 1149, a laser diode driver IC 1104 is connected, and to the laser diode driver IC 1104, a transmission signal multiplexer 1103 is connected. To the transmission signal multiplexer 1103, an electric signal input terminal 1125 for inputting a plurality of signals is connected. The laser diode driver IC 1104 controls the current bias supplied to the laser diode, and superimposes digital signals.

On the other hand, to a photodiode 1249, a reception front end IC 1114 is connected, and to the reception front end IC 1114, a reception signal demultiplexer 1113 is connected. To the reception signal demultiplexer 1113, a reception signal output terminal 1135 for outputting a plurality of signals is connected. The reception front end IC 1114 low-noise-amplifies the faint signal output from the photodiode 1249.

In FIG. 24, the laser diode 1149 and the elements disposed on the right side of the photodiode 1249 are as described above. By using such an optical transmission apparatus, a plurality of electric signals can be transmitted on an optical fiber cable through one optical input and output terminal.

A plurality of the above-described optical modules for transmission and reception can be used as an optical transmission system for transmission and reception by being connected through an optical fiber cable. In this case, for example, two optical modules for transmission and reception prepared as a pair can be used as a pair of optical transmission systems for transmission and reception by making a setting such that one optical transmitter and receiver module performs transmission at the wavelength $\lambda 1$ and reception at the wavelength $\lambda 2$ and the other optical transmitter and receiver module performs transmission at the wavelength $\lambda 2$ and reception at the wavelength $\lambda 1$.

While in the description given above, the top, the bottom, the right and the left are fixed to those shown in the figures, they may be different from those described above as long as similar effects are obtained.

While in the description given above, light from a horizontal direction is made to travel in the vertical direction or at an angle of 45°, these are merely examples. The light may be made to travel at an arbitrary angle with respect to the laminated substrates. In that case, the angles of the reflecting surfaces and the arrangement of the lenses and the reflecting surfaces are settable so that the light travels in such a manner.

While in the above-described embodiments, the substrates are formed of forming glass, the present invention is not limited thereto; they may be formed of resin or the like. The substrates may be formed, for example, by forming the markers 101 and 103 at the same time together with the waveguides on a silicon substrate by dry etching. In that case, similar effects to those described above are obtained.

In the above-described embodiments, the planar substrates other than the one having a waveguide may be sheet optical elements in addition to or instead of the lens layer, the isolator layer and the filter layer. Examples of such sheet optical elements include a sheet attenuator attenuating optical power.

According to the present invention, a low-cost three-dimensional optical waveguide not requiring a complicated adjustment can be provided.

Moreover, when the planar waveguide, and the lens layer, the isolator layer or the filter layer are integrally formed on forming glass, a low-cost three-dimensional optical waveguide further not requiring a complicated adjustment can be provided.

Moreover, when the planar substrate has the lens layer, the isolator layer or the filter layer, a high-performance three-dimensional optical waveguide can be provided.

Moreover, according to the method of manufacturing a three-dimensional optical waveguide of the present invention, a precise and low-cost three-dimensional optical waveguide not requiring a complicated adjustment can be provided.

Moreover, according to the optical module having the three-dimensional optical waveguide of the present invention, a low-cost optical module not requiring a complicated adjustment can be provided.

What is claimed is:

1. A method of manufacturing a three-dimensional optical waveguide, the three dimensional optical waveguide including at least one optical waveguide, the one optical waveguide guiding light received from an external light source, the method comprising:

forming the one optical waveguide within a first glass substrate, the light emitted from the light source being guided through the one optical waveguide;

forming a lens integrally within a second glass substrate, the lens focusing light from the one optical waveguide toward an external predetermined light receiving device, the light being guided from the light source to the predetermined light receiving device through the first glass substrate and the second glass substrate; and laminating the second glass substrate on the first glass substrate, wherein a predetermined alignment mark is formed on the second glass substrate during forming of the lens on the second glass substrate, the predetermined alignment mark being utilized for aligning the lens with the one optical waveguide when the second glass substrate is laminated on the first glass substrate.

2. The method of manufacturing the three-dimensional optical waveguide according to claim 1, wherein forming the one optical waveguide within the first glass substrate comprises:

forming a groove on the first glass substrate; and filling resin in the groove formed on the first glass substrate to form the one optical waveguide, the light received from the external light source being guided through the resin filled in the groove as the one optical waveguide.

3. The method of manufacturing the three-dimensional optical waveguide according to claim 1, wherein the predetermined alignment mark comprises one of a concave shape and a convex shape.

4. The method of manufacturing the three-dimensional optical waveguide according to claim 1, wherein the second glass substrate is positioned with respect to the first glass substrate by applying light to the predetermined alignment mark when the second glass substrate is laminated on the first glass substrate.

5. The method of manufacturing the three-dimensional optical waveguide according to claim 1, wherein the predetermined alignment mark is a second groove formed on the second glass substrate, a bottom surface of the second groove including one of an inclined surface, a scattering surface, and a lens surface.

6. The method of manufacturing the three-dimensional optical waveguide according to claim 1, wherein the predetermined alignment mark is a protrusion formed on the second glass substrate, a top surface of the protrusion including one of an inclined surface, a scattering surface, and a lens surface.

7. The method of manufacturing the three-dimensional optical waveguide according to claim 2, wherein
the first glass substrate has a viscosity sufficient to form the groove on the first glass substrate by pressing.

8. The method of manufacturing the three-dimensional optical waveguide according to claim 1, wherein the second glass substrate has a viscosity sufficient to integrally form the lens within the second glass substrate by pressing.

* * * * *